US012774182B2

(12) United States Patent
Matsuyama et al.

(10) Patent No.: US 12,774,182 B2
(45) Date of Patent: Oct. 27, 2026

(54) MEDIUM TRANSPORT DEVICE AND IMAGE READING APPARATUS

(71) Applicant: SEIKO EPSON CORPORATION, Tokyo (JP)

(72) Inventors: Koya Matsuyama, Kitakyushu (JP); Seiji Takamatsu, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 19/063,671

(22) Filed: Feb. 26, 2025

(65) Prior Publication Data

US 2025/0276864 A1 Sep. 4, 2025

(30) Foreign Application Priority Data

Feb. 29, 2024 (JP) ................................. 2024-029619

(51) Int. Cl.
*B65H 7/12* (2006.01)
*B65H 5/06* (2006.01)
*H04N 1/00* (2006.01)

(52) U.S. Cl.
CPC ............. *B65H 7/125* (2013.01); *B65H 5/062* (2013.01); *H04N 1/00602* (2013.01); *H04N 1/00702* (2013.01); *H04N 1/00729* (2013.01); *B65H 2301/44318* (2013.01); *B65H 2301/4492* (2013.01); *B65H 2553/30* (2013.01); *B65H 2801/39* (2013.01)

(58) Field of Classification Search
CPC ...... B65H 2553/30; B65H 7/12; B65H 7/125; B65H 2511/524; B65H 2511/13; G03G 2215/00637
See application file for complete search history.

(56) References Cited

U.S. PATENT DOCUMENTS

2014/0091516 A1* 4/2014 Okitsu .................... B65H 7/125 271/262
2020/0039774 A1 2/2020 Yamada et al.

FOREIGN PATENT DOCUMENTS

JP 2017172994 A * 9/2017
JP 2020-025242 2/2020
WO WO-2017163755 A1 * 9/2017 ............. G01N 29/11

OTHER PUBLICATIONS

Machine Translation of WO 2017/163755 A1 (Year: 2026).*

* cited by examiner

*Primary Examiner* — Luis A Gonzalez
(74) *Attorney, Agent, or Firm* — WORKMAN NYDEGGER

(57) ABSTRACT

An ultrasonic detection unit includes a transmission sensor chip, a reception sensor chip, a transmission substrate provided with the transmission sensor chip, and a reception substrate provided with the reception sensor chip. The reception substrate is provided with an amplifier that amplifies a reception signal of an ultrasonic wave received by the reception sensor chip, and a shielding member that covers at least a part of the amplifier. A height of the reception sensor chip with respect to the reception substrate is lower than a height of the shielding member with respect to the reception substrate.

8 Claims, 32 Drawing Sheets

MEDIUM TRANSPORT DEVICE AND IMAGE READING APPARATUS

The present application is based on, and claims priority from JP Application Serial Number 2024-029619, filed Feb. 29, 2024, the disclosure of which is hereby incorporated by reference herein in its entirety.

BACKGROUND

1. Technical Field

The present disclosure relates to a medium transport device that transports a medium and an image apparatus including the medium transport device.

2. Related Art

Hitherto, as disclosed in JP-A-2020-25242, there has been used a technique of detecting double feeding of media by using an ultrasonic sensor.

Adoption of an ultrasonic sensor easily causes an increase of a device size.

In the related art, there is room for improvement in view of device size reduction by devising a configuration of an ultrasonic sensor and arrangement thereof.

SUMMARY

In order to solve the above-mentioned problem, a medium transport device according to the present disclosure includes a first roller pair configured to transport a medium in a transport direction, a second roller pair arranged downstream of the first roller pair in the transport direction, and an ultrasonic detection unit arranged between the first roller pair and the second roller pair in the transport direction, wherein the ultrasonic detection unit includes a transmission sensor chip configured to emit an ultrasonic wave along a first axis toward a first surface of the medium being transported, a reception sensor chip being configured to receive an ultrasonic wave and being arranged at a position on the first axis so that the medium is sandwiched between the reception sensor chip and the transmission sensor chip, a transmission substrate being provided with the transmission sensor chip and including a substrate surface on which the transmission sensor chip is placed, a reception substrate being provided with the reception sensor chip and including a first substrate surface on which the reception sensor chip is placed, an amplifier being provided at the reception substrate and being configured to amplify a reception signal of an ultrasonic wave received by the reception sensor chip, and a shielding member being provided at the reception substrate and being configured to cover at least a part of the amplifier, and a height of the reception sensor chip with respect to the reception substrate is lower than a height of the shielding member with respect to the reception substrate.

Further, an image reading apparatus according to the present disclosure includes the medium transport device, and a reading unit being located downstream of the second roller pair in the transport direction and being configured to read an image of the medium.

DESCRIPTION OF EMBODIMENTS

Figure 1:
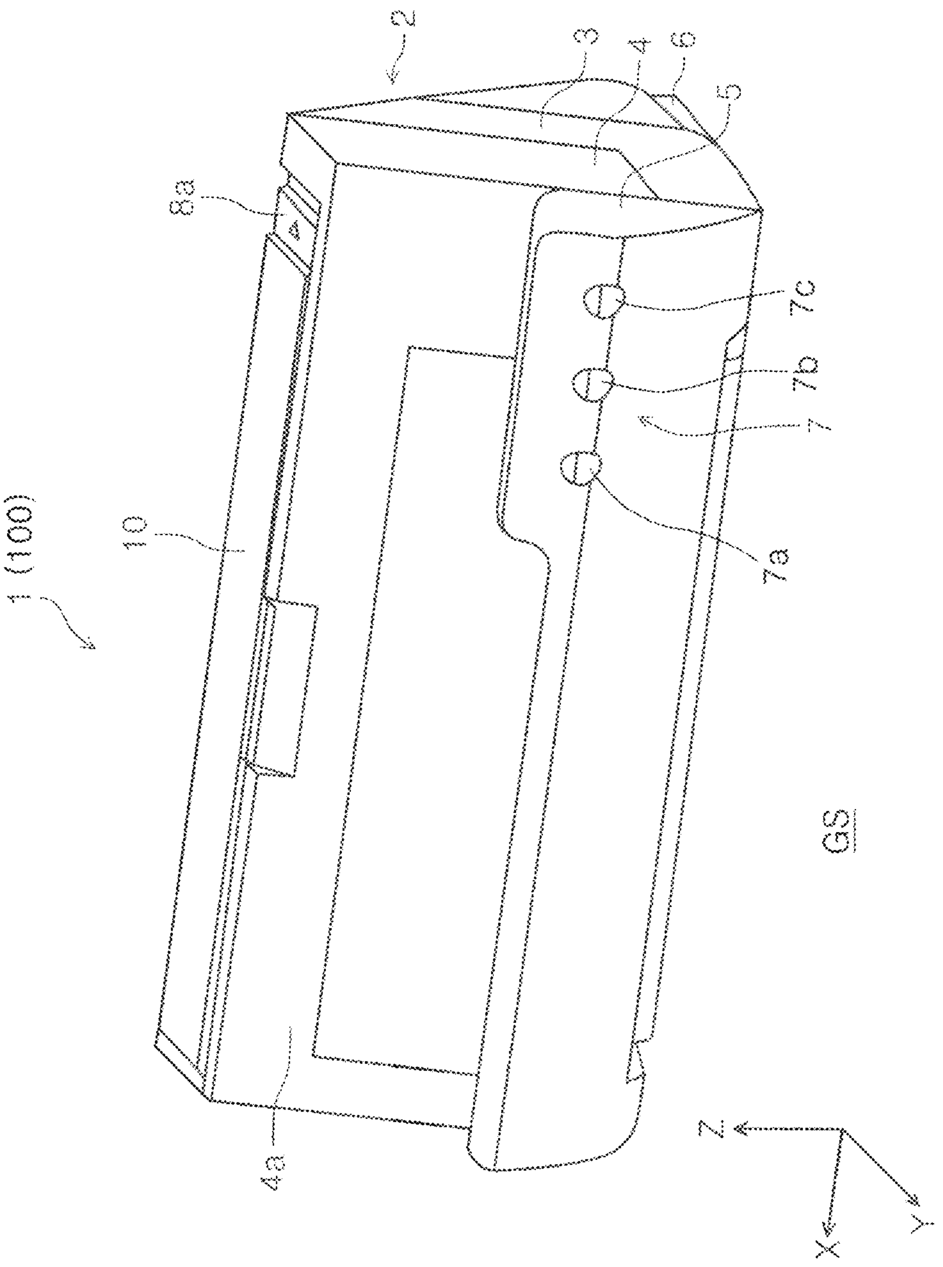
FIG. 1 is a perspective view of a scanner as viewed from the front.

Hereinafter, the present disclosure is described in brief.

A medium transport device according to a first aspect includes a first roller pair configured to transport a medium in a transport direction, a second roller pair arranged downstream of the first roller pair in the transport direction, and an ultrasonic detection unit arranged between the first roller pair and the second roller pair in the transport direction, wherein the ultrasonic detection unit includes a transmission sensor chip configured to emit an ultrasonic wave along a first axis toward a first surface of the medium being transported, a reception sensor chip being configured to receive an ultrasonic wave and being arranged at a position on the first axis so that the medium is sandwiched between the reception sensor chip and the transmission sensor chip, a transmission substrate being provided with the transmission sensor chip and including a substrate surface on which the transmission sensor chip is placed, a reception substrate being provided with the reception sensor chip and including a first substrate surface on which the reception sensor chip is placed, an amplifier being provided at the reception substrate and being configured to amplify a reception signal of an ultrasonic wave received by the reception sensor chip, and a shielding member being provided at the reception substrate and being configured to cover at least a part of the amplifier, and a height of the reception sensor chip with respect to the reception substrate is lower than a height of the shielding member with respect to the reception substrate.

According to the present aspect, a height of the reception sensor chip with respect to the reception substrate is lower than a height of the shielding member with respect to the reception substrate. Thus, in the configuration in which the ultrasonic detection unit includes the reception substrate and the shielding member, a device dimension can be reduced.

The second aspect is an aspect dependent on the first aspect, wherein the first axis is inclined with respect to a surface of the medium passing through between the transmission sensor chip and the reception sensor chip, a thickness of the transmission sensor chip is less than a thickness of the transmission substrate, a thickness of the reception sensor chip is less than a thickness of the reception substrate, and at least a part of the transmission sensor chip and at least a part of the reception sensor chip are present within a range of the second roller pair in a normal line direction with respect to a surface of the medium at a nipping position of the second roller pair.

According to the present aspect, at least a part of the transmission sensor chip and at least a part of the reception sensor chip are present within the range of the second roller pair in the normal line direction with respect to the surface of the medium at the nipping position of the second roller pair. Thus, a device dimension in the normal line direction with respect to the surface of the medium at the nipping position of the second roller pair can be reduced.

The third aspect is an aspect dependent on the first aspect, wherein the amplifier and the shielding member are provided to a surface of the reception substrate, the surface being opposite to the surface at which the reception sensor chip is provided.

According to the present aspect, the amplifier and the shielding member are provided to a surface of the reception substrate, the surface being opposite to the surface at which the reception sensor chip is provided. Thus, the one surface and the other surface of the reception substrate can be utilized efficiently, and the reception substrate is easily reduced in size. With this, a device dimension can be reduced.

This aspect is not limited to the first aspect, and may be subordinate to the second aspect.

The fourth aspect is an aspect dependent on the first aspect, wherein the reception substrate is provided with a connector at a surface opposite to a surface facing the transmission sensor chip, and the amplifier and the shielding member are arranged at a surface of the reception substrate, the surface being provided with the connector.

According to the present aspect, the amplifier and the shielding member are arranged in a space generated by arranging the connector. Thus, a device dimension can be reduced.

This aspect is not limited to the first aspect, and may be subordinate to the second aspect.

The fifth aspect is an aspect dependent on the first aspect, wherein the amplifier is arranged at the surface of the reception substrate, the surface being a surface provided with the reception sensor chip, and the shielding member covers the reception sensor chip in addition to the amplifier.

According to the present aspect, the shielding member covers the reception sensor chip in addition to the amplifier. Thus, the same shielding member covers the amplifier and the reception sensor chip, and cost reduction can be achieved while reducing a device dimension.

This aspect is not limited to the first aspect, and may be subordinate to the second aspect.

The sixth aspect is an aspect dependent on the first aspect, wherein at least a part of the reception substrate and at least a part of the shielding member are present within any one of a range of the first roller pair in a normal line direction with respect to a surface of the medium at a nipping position of the first roller pair, and a range of the second roller pair in a normal line direction with respect to a surface of the medium at a nipping position of the second roller pair.

According to the present aspect, at least a part of the reception substrate and at least a part of the shielding member are present within any one of a range of the first roller pair in a normal line direction with respect to a surface of the medium at a nipping position of the first roller pair, and a range of the second roller pair in a normal line direction with respect to a surface of the medium at a nipping position of the second roller pair. Thus, a device dimension in the normal line direction with respect to the surface of the medium at the nipping position of the first roller pair or the second roller pair can be reduced.

This aspect is not limited to the first aspect, and may be subordinate to any of the second to fifth aspects.

The seventh aspect is an aspect dependent on the first aspect, wherein the first axis is inclined with respect to a surface of the medium passing through between the transmission sensor chip and the reception sensor chip, and, when the ultrasonic detection unit is calibrated, the reception sensor chip receives an ultrasonic wave while a bias voltage is applied to the reception sensor chip, and the amplifier amplifies the reception signal.

According to the present aspect, when a piezoelectric element is used in the reception sensor chip, variations in the polarization direction of the piezoelectric element are less likely to occur, an efficient amplitude can be obtained, and an appropriate reception signal can be output.

This aspect is not limited to the first aspect, and may be subordinate to any of the second to sixth aspects.

The eighth aspect is an aspect dependent on the seventh aspect, wherein the first axis is inclined with respect to a surface of the medium passing through between the transmission sensor chip and the reception sensor chip, and, when the ultrasonic detection unit detects double feeding of media, the reception sensor chip receives an ultrasonic wave while a bias voltage is applied to the reception sensor chip, and the amplifier amplifies the reception signal.

According to the present aspect, when a piezoelectric element is used in the reception sensor chip, variations in the polarization direction of the piezoelectric element are less likely to occur, an efficient amplitude can be obtained, and an appropriate reception signal can be output.

An image reading apparatus according to a ninth aspect includes the medium transport device according to any one of the first to eighth aspects, and a reading unit being located downstream of the second roller pair in the transport direction and being configured to read an image of the medium.

According to the present aspect, the operational effects of any one of the first to eighth aspects described above can be obtained in the image reading apparatus.

Hereinafter, the present disclosure is described in detail.

Hereinafter, as an example of the image reading apparatus, a scanner 1 capable of reading at least one surface of a first surface S1 and a second surface S2 opposite to the first surface S1 of a document P being an example of a medium is described. The scanner 1 is a so-called sheet-feed type scanner that reads the document P while moving the document P with respect to a first reading unit 32 and a second reading unit 33, which are described later.

In this specification, the document P includes not only a sheet-like document but also a card-like document and a booklet-like document.

Note that the scanner 1 can be considered as a medium transport device 100 from the perspective of transporting the document P being an example of the medium. In this case, the scanner 1 is configured to include the medium transport device 100, and the first reading unit 32 and the second reading unit 33, which are described later.

In an XYZ coordinate system illustrated in each of drawings, an X-axis direction is a width direction of a device and a document width direction. A Y-axis direction is a depth direction of the device, and a Z-axis direction is a direction along a vertical direction. In the present exemplary embodiment, a +Y direction is a direction from a rear surface to a front surface of the apparatus, and a −Y direction is a direction from the front surface to the rear surface of the apparatus. Also, a left direction as seen from the front surface of the apparatus is a +X direction, and a right direction is a −X direction.

Also, hereinafter, a direction in which the document P is transported may be referred to as "downstream", and a direction opposite thereto may be referred to as "upstream".

Overview of Scanner

In FIG. 1, the scanner 1 includes a device main body 2 and a main body support unit 6 that supports the device main body 2. The main body support unit 6 is placed on a placement surface GS of the device. As an example, the placement surface GS is a surface parallel to a horizontal plane.

The device main body 2 includes a first unit 3, a second unit 4, and a third unit 5.

The second unit 4 and the third unit 5 are provided to the first unit 3 rotatably about a rotary shaft (omitted in illustration) parallel to the X-axis direction. The second unit 4 and the third unit 5 can rotate integrally about the rotary shaft with respect to the first unit 3. The reference symbol 8*a* in FIG. 1 is an unlocking unit. A user can unlock the second unit 4 and the third unit 5 with respect to the first unit 3 by sliding the unlocking unit 8*a* in the −X direction. Further, when the second unit 4 and the third unit 5 rotate with respect to the first unit 3, a part of a document transport path can be exposed (see FIG. 4). In particular, when the second unit 4 is opened with respect to the first unit 3, an upstream feeding path R0, a downstream feeding path R1, and a reading transport path R2, which are described later, can be exposed.

Further, the third unit 5 can rotate with respect to the first unit 3 and the second unit 4 about a rotary shaft (omitted in illustration) parallel to the X-axis direction. When the third unit 5 rotates with respect to the second unit 4, a U-turn discharge path R3 (see FIG. 2) located downstream of the reading transport path R2, which is described later, can be exposed. In other words, the U-turn discharge path R3 is formed between the third unit 5 and the second unit 4.

Note that the third unit 5 is held with respect to the second unit 4 by a snap-fit structure (omitted in illustration). When a suer applies an external force to the third unit 5, holding of the third unit 5 with respect to the second unit 4 can be canceled to open the third unit 5.

Figure 2:
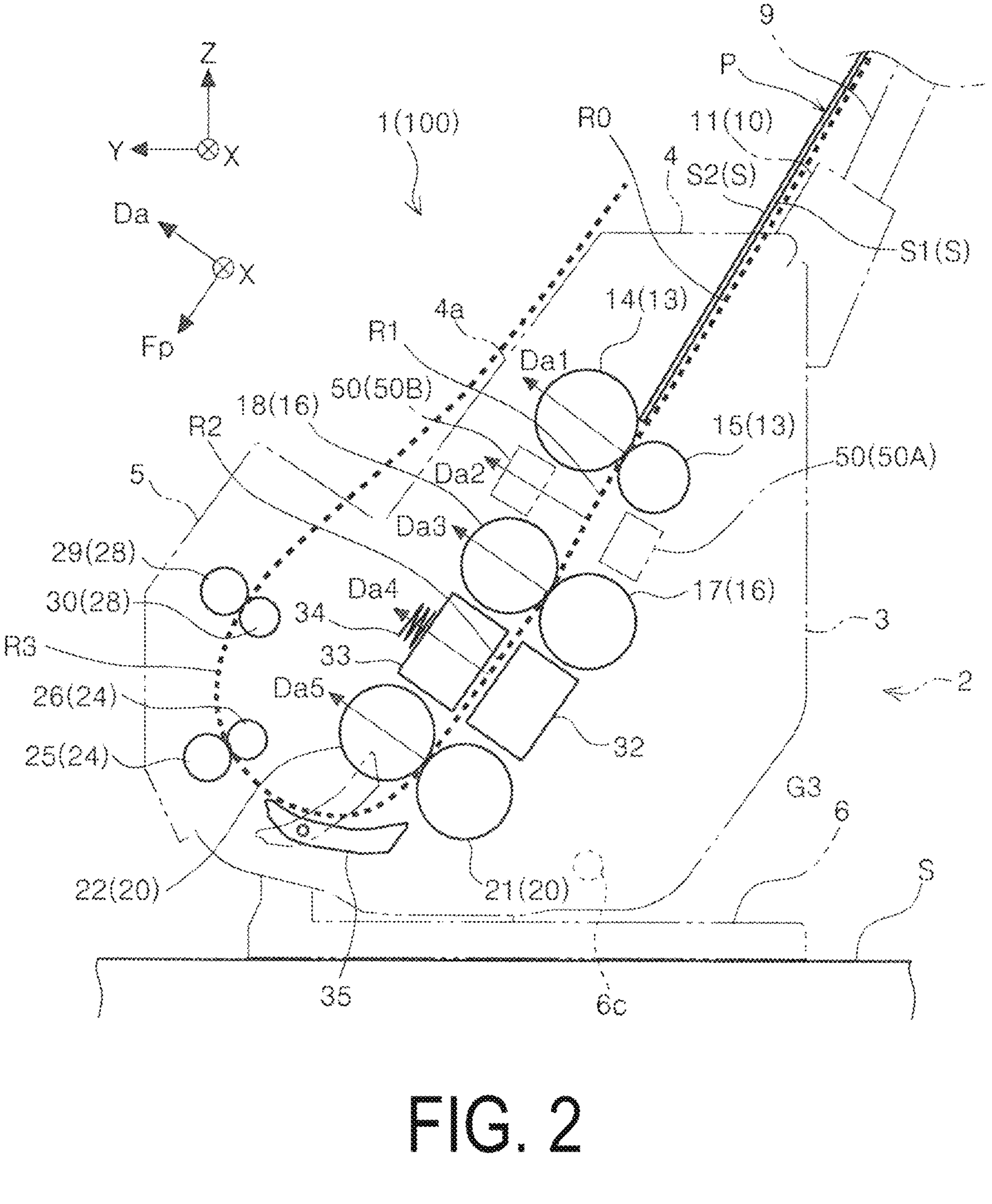
FIG. 2 is a view of a document transport path of the scanner as viewed in a width direction.

The device main body 2 is rotatable about a main body rotary shaft 6*c* (see FIG. 2) with respect to the main body support unit 6, and in the embodiment, the device main body 2 can hold two postures by rotating. The posture of the device main body 2 illustrated in FIG. 2 is one of the two postures, and is a normal reading posture. Note that the device main body 2 may rotate from the normal reading posture so that the reading transport path R2 approaches the horizontal plane, and may be in a booklet reading posture (omitted in illustration).

In FIG. 1, an operation unit 7 configured by a plurality of operation buttons is provided at the front surface of the device. The plurality of operation buttons are configured by operation buttons 7*a*, 7*b*, and 7*c* in the embodiment, and a user operation is received with those buttons.

Document Transport Path in Scanner

Next, with reference to FIG. 2, a document transport path in the scanner 1 is described. The bold broken line in FIG. 2 indicates a transport path in which the document P is transported.

The reference symbol R0 is a transport path upstream of a first roller pair 13, and is referred to as the upstream feeding path R0 hereinafter.

The reference symbol R1 is a transport path between the first roller pair 13 and a second roller pair 16, and is referred to as the downstream feeding path R1.

The reference symbol R2 is a transport path between the second roller pair 16 and a third roller pair 20, and is referred to as the reading transport path R2. Note that the reading transport path R2 is a transport path that faces the first reading unit 32 and the second reading unit 33, which are described later.

The first unit 3 forms the lower sides of the upstream feeding path R0, the downstream feeding path R1, and the reading transport path R2, and the second unit 4 forms the upper sides of the upstream feeding path R0, the downstream feeding path R1, and the reading transport path R2.

Further, the reference symbol R3 is a transport path that is inverted upward from the third roller pair 20, and is referred to as the U-turn discharge path R3. The U-turn discharge path R3 is formed between the second unit 4 and the third unit 5.

The normal reading posture (FIG. 2) of the device main body 2 is a posture in which the reading transport path R2 is coupled to the U-turn discharge path R3 by a flap 35. Note that, in the booklet reading posture (omitted in illustration) of the device main body 2, the flap 35 is in a posture indicated by the two-dot chain line, the reading transport path R2 is not coupled to the U-turn discharge path R3, and the document P is discharged in an obliquely downward direction containing a +Y-direction component and a −Z-direction component from the reading transport path R2.

The normal reading posture is suitable for reading a sheet-like document P, that is, a document P which has low rigidity and is easily bent. The booklet reading posture is suitable for reading a document P such as a plastic card or a booklet which has high rigidity and is not easily bent.

Hereinafter, the document transport path is further described. The document P being fed is supported in an inclined posture by a document support unit 11 and a document support 9. When the plurality of documents P are supported by the document support unit 11, the uppermost document P is fed downstream by a feeding roller 14. The document support unit 11 is formed in an upper opening and closing unit 10. The upper opening and closing unit 10 is rotatable about a rotary shaft (not illustrated), and rotates to open and close a feeding port.

The document support 9 may be in a state of being accommodated in the upper opening and closing unit 10 and a state of being deployed from the upper opening and closing unit 10. FIG. 1 illustrates a state of closing the upper opening and closing unit 10, and FIG. 2 illustrates a state of opening the upper opening and closing unit 10 and deploying the document support 9. The upper opening and closing unit 10 and the document support 9 form the first unit 3.

Note that the scanner 1 adopts a so-called center feeding method, and center positions of the documents P in the X-axis direction, that is, the width direction match regardless of the sizes of the documents P.

The feeding roller 14 and a separation roller 15 form the first roller pair 13.

The feeding roller 14 is provided to the second unit 4. The feeding roller 14 gains a driving force from a transport motor 47 (see FIG. 3) to rotate. The separation roller 15 is provided at a position facing the feeding roller 14 in the first unit 3. A rotation torque is applied to the separation roller 15 by a torque limiter 15*b* (see FIG. 6). With this, double feeding of the documents P is prevented.

Further, in the embodiment, the feeding roller 14 is provided on the upper side with respect to the document P placed on the document support unit 11, and the uppermost document P is first fed. Alternatively, the feeding roller 14 may be provided on the lower side with respect to the document P placed on the document support unit 11, and the lowermost document P may first be fed.

An ultrasonic detection unit 50 is provided downstream of the first roller pair 13 in the downstream feeding path R1. The ultrasonic detection unit 50 is configured to include a transmission unit 50A and a reception unit 50B that are arranged to face each other across the downstream feeding path R1. A control unit 80 (see FIG. 3) can detect double feeding of the documents P, based on a signal transmitted from the reception unit 50B.

Note that, in FIG. 2, positions, sizes, and shapes of the transmission unit 50A and the reception unit 50B are schematically illustrated, and details thereof are described later with reference to FIG. 4 and the subsequent figures.

Note that, in the embodiment, the transmission unit 50A is arranged on the lower side of the downstream feeding path R1, and the reception unit 50B is arranged on the upper side of the downstream feeding path R1. However, the embodiment is not limited thereto. Alternatively, the reception unit 50B may be arranged on the lower side of the downstream feeding path R1, and the transmission unit 50A may be arranged on the upper side of the downstream feeding path R1.

The second roller pair 16 is provided downstream of the feeding roller 14 and the separation roller 15. The second roller pair 16 is configured by a second lower roller 17 provided to the first unit 3 and a second upper roller 18 provided to the second unit 4. The second upper roller 18 is provided to advance and retract with respect to the second lower roller 17, and is pressed toward the second lower roller 17 by a pressing member (omitted in illustration), for example, a coil spring. With this, the second upper roller 18 advances and retracts with respect to the second lower roller 17 according to the thickness of the document P being transported. The second lower roller 17 and the second upper roller 18 both gain a driving force from the transport motor 47 (see FIG. 3) to rotate.

When the second unit 4 is closed with respect to the first unit 3, the second lower roller 17 and the second upper roller 18 contact with each other. When the second unit 4 is opened with respect to the first unit 3, the second upper roller 18 is separated from the second lower roller 17.

The first reading unit 32 and the second reading unit 33 are arranged to face each other downstream of the second roller pair 16. The first reading unit 32 is provided to the first unit 3, and the second reading unit 33 is provided to the second unit 4.

The first reading unit 32 reads the lower surface, that is, the first surface S1 of the document P supported on the document support unit 11, and the second reading unit 33 reads the upper surface, that is, the second surface S2 of the document P supported on the document support unit 11. The second reading unit 33 is provided to advance and retract with respect to the first reading unit 32, and is pressed toward the first reading unit 32 by a pressing spring 34 being an example of a pressing member. With this, the second reading unit 33 advances and retracts with respect to the first reading unit 32 according to the thickness of the document P being transported.

In the embodiment, the first reading unit 32 and the second reading unit 33 is configured by a contact image sensor module (CISM).

The third roller pair 20 is provided downstream of the first reading unit 32 and the second reading unit 33. The third roller pair 20 is configured by a third lower roller 21 provided to the first unit 3 and a third upper roller 22 provided to the second unit 4. The third upper roller 22 is provided to advance and retract with respect to the third lower roller 21, and is pressed toward the third lower roller 21 by a pressing member (omitted in illustration), for example, a coil spring.

The third lower roller 21 and the third upper roller 22 both gain a driving force from the transport motor 47 (see FIG. 3) to rotate.

When the second unit 4 is closed with respect to the first unit 3, the third lower roller 21 and the third upper roller 22 contact with each other. When the second unit 4 is opened with respect to the first unit 3, the third upper roller 22 is separated from the third lower roller 21.

The flap 35 is provided downstream of the third roller pair 20. The flap 35 rotates to switch the document transport paths described above.

Note that, in the embodiment, the flap 35 is configured to rotate in conjunction with switching of the posture of the device main body 2. In the embodiment, as a configuration for rotating the flap 35 in conjunction with switching of the posture of the device main body 2, mechanical rotation is performed by a conjunction mechanism (omitted in illustration), for example, a cam mechanism in conjunction with the posture of the device main body 2. However, the flap 35 may rotate by a solenoid (omitted in illustration). In such a case, the control unit 80 (see FIG. 3) that executes various controls drives the solenoid to rotate the flap 35, based on detection information of a posture detection sensor (omitted in illustration).

The U-turn discharge path R3 is provided with a fourth roller pair 24 and a fifth roller pair 28.

The fourth roller pair 24 is configured by a fourth driving roller 25 provided to the third unit 5 and a fourth driven roller 26 provided to the second unit 4. The fourth driven roller 26 is provided to advance and retract with respect to the fourth driving roller 25, and is pressed toward the fourth driving roller 25 by a pressing member (omitted in illustration), for example, a coil spring. With this, the fourth driven roller 26 advances and retracts with respect to the fourth driving roller 25 according to the thickness of the document P being transported. The fourth driving roller 25 is driven by the transport motor 47 (see FIG. 3). The fourth driven roller 26 is a roller that is driven to rotate.

The fifth roller pair 28 is configured by a fifth driving roller 29 provided to the third unit 5 and a fifth driven roller 30 provided to the second unit 4. The fifth driven roller 30 is provided to advance and retract with respect to the fifth driving roller 29, and is pressed toward the fifth driving roller 29 by a pressing member (omitted in illustration), for example, a coil spring. With this, the fifth driven roller 30 advances and retracts with respect to the fifth driving roller 29 according to the thickness of the document P being transported. The fifth driving roller 29 is driven by the transport motor 47 (see FIG. 3). The fifth driven roller 30 is a roller that is driven to rotate.

When the third unit 5 is closed with respect to the second unit 4, the fourth driving roller 25 and the fourth driven roller 26 contact with each other, and the fifth driving roller 29 and the fifth driven roller 30 also contact with each other. When the third unit 5 is opened with respect to the second unit 4, the fourth driving roller 25 and the fourth driven roller 26 are separated from each other, and the fifth driving roller 29 and the fifth driven roller 30 are also separated from each other.

The document P discharged from the U-turn discharge path R3 is discharged in an obliquely upward direction containing a −Y-direction component by the fifth roller pair 28, and is supported in an inclined posture by an upper surface 4*a* of the second unit 4.

Note that, in FIG. 2, the direction indicated by the arrow Da1 indicates a normal line direction with respect to the first surface S1 of the document P and the second surface S2 opposite thereto at a document nipping position of the first roller pair 13. Note that the first surface S1 of the document P and the second surface S2 opposite thereto are collectively referred to as a document surface S when the surfaces are not distinguished from each other. This is because the surfaces are parallel to each other in most cases.

Further, the arrow Da2 indicates a normal direction with respect to the document surface S of the document P passing through between the transmission unit 50A and the reception unit 50B of the ultrasonic detection unit 50.

Further, the arrow Da3 indicates a normal direction with respect to the document surface S at a document nipping position of the second roller pair 16.

Further, the arrow Da4 indicates a normal direction with respect to the document surface S of the document P passing through between the first reading unit 32 and the second reading unit 33.

Further, the arrow Da5 indicates a normal direction with respect to the document surface S at a document nipping position of the third roller pair 20.

In the embodiment, differences between normal directions Da1, Da2, Da3, Da4, and Da5 are slight. As an example, a difference between the maximum angle and the minimum angle is less than 5 degrees. Thus, in the following description, when the respective normal line directions are not distinguished from one another, the normal line directions are referred to as a normal direction Da.

Further, in FIG. 2, the direction indicated by the arrow Fp indicates a direction that is orthogonal to the normal direction Da, and indicates a direction in which the document P is transported. Hereinafter, the direction is referred to as a transport direction Fp.

Figure 4:
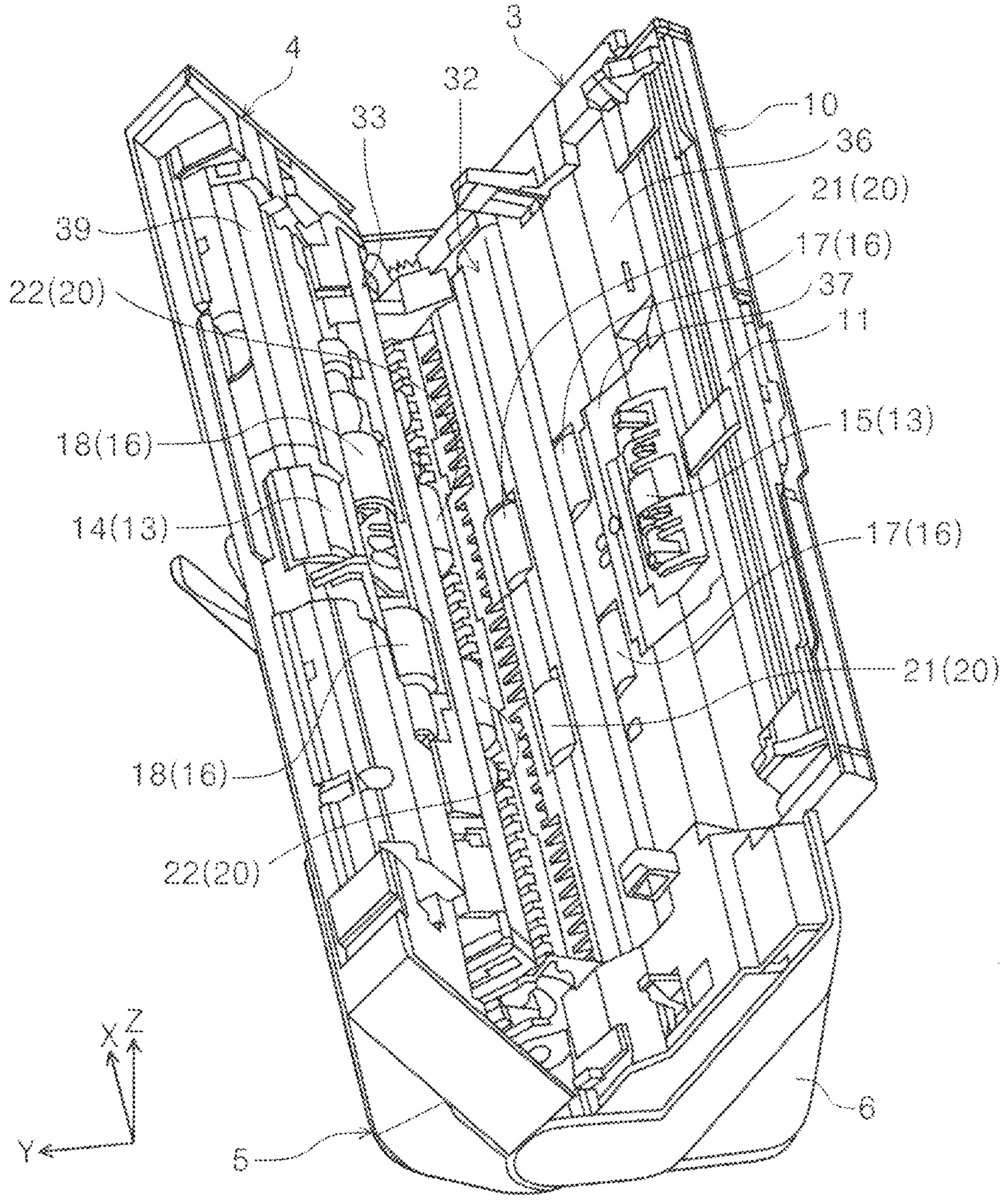
FIG. 4 is a perspective view of a state in which a second unit is opened with respect to a first unit.

Note that, in FIG. 4 and the subsequent figures, it is assumed that an X-Fp-Da coordinate system is used in some cases.

Control System of Scanner

Figure 3:
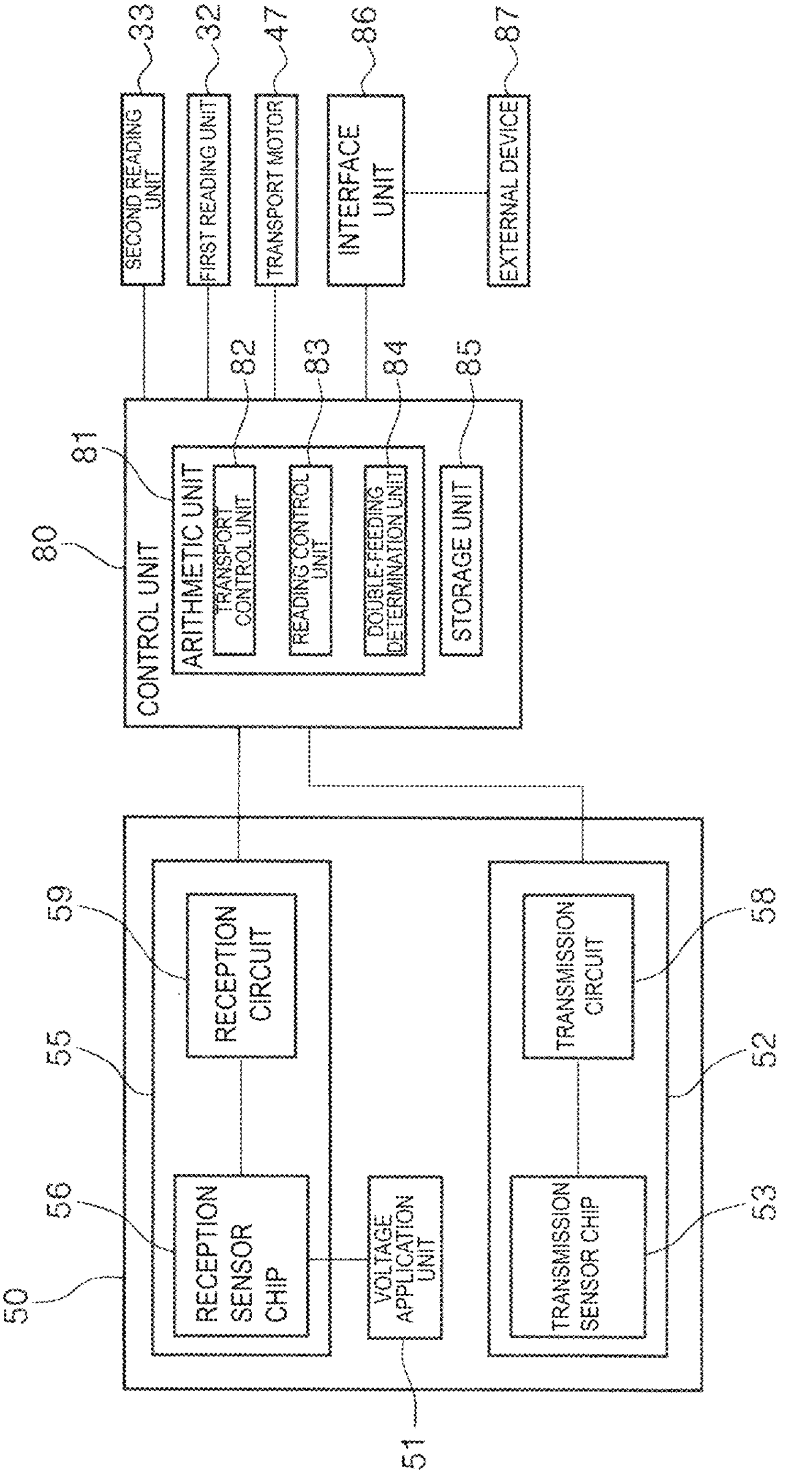
FIG. 3 is a block diagram illustrating a control system of the scanner.

Next, with reference to FIG. 3, a control system of the scanner 1 is described.

The control unit 80 includes an arithmetic unit 81 configured by a central processing unit (CPU) and a storage unit 85 configured by a non-volatile memory or a volatile memory.

The control unit 80 is coupled to the first reading unit 32, the second reading unit 33, the transport motor 47, and the ultrasonic detection unit 50, and the control unit 80 controls those components. Note that the transport motor 47 is a driving source of the feeding roller 14, the second lower roller 17, the second upper roller 18, the third lower roller 21, the third upper roller 22, the fourth driving roller 25, and the fifth driving roller 29.

The control unit 80 is coupled to an interface unit 86, receives various data or a signal that is input from an external device 87 such as a personal computer, and outputs read data that is read by the scanner 1 to the external device 87.

Various data for controlling the scanner 1 and various programs are recorded in the storage unit 85.

The arithmetic unit 81 reads and executes the various programs stored in the storage unit 85 to function as a transport control unit 82, a reading control unit 83, a double-feeding determination unit 84, and the like.

The transport control unit 82 controls the transport motor 47 to rotate the plurality of rollers described above. With this, the document P is fed, transported, and discharged.

The reading control unit 83 controls the first reading unit 32 and the second reading unit 33 to read an image of the document P while the document P is transported.

The double-feeding determination unit 84 is a state detection unit that detects a state of the document P. In the embodiment, the double-feeding determination unit 84 determines whether double feeding of the documents P occurs, based on a reception signal that is input from a reception circuit 59 (described later).

Specifically, when a voltage value of the reception signal is less than a predetermined threshold value, it is determined that double-feeding of the documents P occurs. Note that, when the double-feeding determination unit 84 determines that double-feeding occurs, the transport control unit 82 stops the transport of the document P.

Basic Configuration of Ultrasonic Detection Unit

Next, a basic configuration of the ultrasonic detection unit 50 is described.

Figure 22:
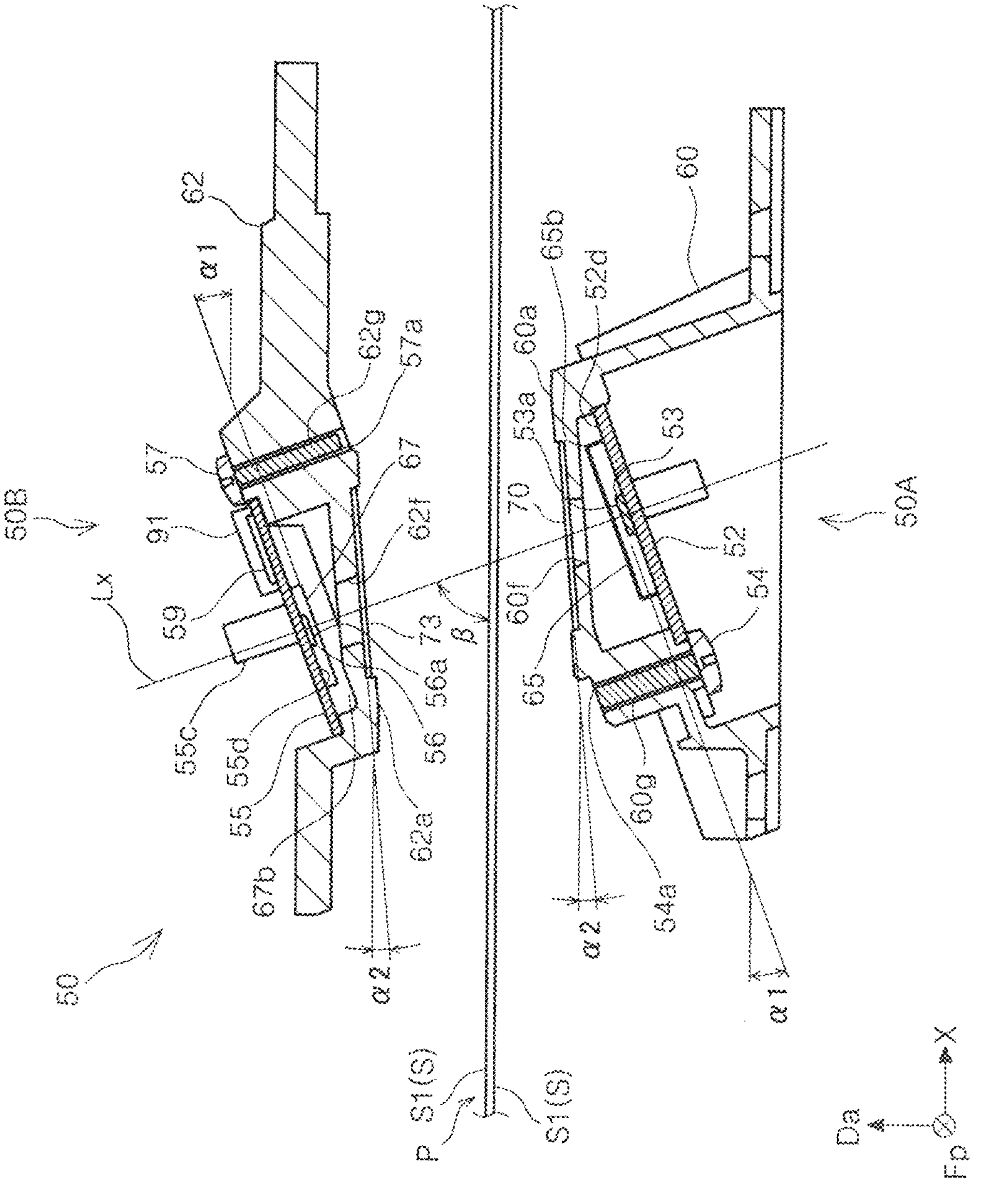
FIG. 22 is a cross-sectional view illustrating a configuration of an ultrasonic detection unit.

In FIG. 22, the ultrasonic detection unit 50 is configured to include a pair of ultrasonic elements. One of the pair of ultrasonic elements is a transmission sensor chip 53, and the transmission sensor chip 53 transmits an ultrasonic wave. The other of the pair of ultrasonic elements is a reception sensor chip 56, and the reception sensor chip 56 receives an ultrasonic wave.

The transmission sensor chip 53 and the reception sensor chip 56 face each other on a sensor center axis Lx being an example of a first axis, and are arranged across the document P that is transported in the downstream feeding path R1.

In the ultrasonic detection unit 50, the transmission sensor chip 53 emits an ultrasonic wave toward the first surface S1 of the document P being fed. The ultrasonic wave emitted from the transmission sensor chip 53 passes through the document P. The ultrasonic wave transmitted through the document P is received by the reception sensor chip 56. When the ultrasonic wave is received by the reception sensor chip 56, a reception signal corresponding to a sound pressure of the received ultrasonic wave is output, and it is determined whether double feeding of the documents P occurs, based on the signal intensity of the reception signal.

The sensor center axis Lx is an axis passing through the center of the transmission sensor chip 53 and the center of the reception sensor chip 56, and is a transmission/reception direction of an ultrasonic wave. The sensor center axis Lx is orthogonal to a transmission surface 53*a* being an upper surface of the transmission sensor chip 53 and a reception surface 56*a* being an upper surface of the reception sensor chip 56.

Further, the sensor center axis Lx is inclined at an angle β with respect to the document surface S of the document P.

Here, when the sensor center axis Lx matches with the normal line direction of the document surface S, in other words, when the angle β is 90 degrees, an ultrasonic wave transmitted from the transmission sensor chip 53 may be reflected for a plurality of times between the document P and the transmission sensor chip 53. Further, an ultrasonic wave passing through the document P may be reflected for a plurality of times between the reception sensor chip 56 and the document P. In such a case, in the reception sensor chip 56, in addition to the ultrasonic wave that is emitted from the transmission sensor chip 53, passes through the document P, and is received by the reception sensor chip 56, the ultrasonic wave that is reflected for a plurality of times between the document P and the transmission sensor chip 53 and the ultrasonic wave that is reflected for a plurality of times between the reception sensor chip 56 and the document P are received by the reception sensor chip 56. Thus, double-feeding cannot be detected accurately.

In contrast, the sensor center axis Lx is inclined with respect to the normal line of the document surface S of the document P. With this, reception of unnecessary ultrasonic wave components such as an ultrasonic wave that is reflected for a plurality of times can be reduced, and double feeding can be detected at high accuracy.

Note that the angle β may be set from 60 degrees to 80 degrees, and is set to 70 degrees in the embodiment.

Note that, when the area of the transmission surface 53*a* of the transmission sensor chip 53 is small, an ultrasonic beam diameter is reduced. In such a case, in a case in which a distance between the transmission sensor chip 53 and the reception sensor chip 56, in other words, a distance along the sensor center axis Lx is small, when the transmission sensor chip 53 is deviated from the sensor center axis Lx, a sound pressure is reduced significantly due to an attachment error. Similarly, when the area of the reception surface 56*a* of the reception sensor chip 56 is small, a sound pressure is reduced significantly during deviation from the sensor center axis Lx. Therefore, the distance between distance between the transmission sensor chip 53 and the reception sensor chip 56 may be secured at a certain degree. However, when the distance between the transmission sensor chip 53 and the reception sensor chip 56 is excessively increased, a sound pressure is also reduced. In the embodiment, in view of the above-mentioned point, the distance along the sensor center axis Lx between the transmission sensor chip 53 and the reception sensor chip 56, in other words, the distance between the sensors is set to a range from 15.0 mm to 30.0 mm, and is set to 24.9 mm as an example.

Configuration of Sensor Chip

A configuration of the ultrasonic detection unit 50 is further described.

As illustrated in FIG. 3, the transmission substrate 52 is provided with a transmission circuit 58 that controls the transmission sensor chip 53, and a reception substrate 55 is provided with the reception circuit 59 that controls the reception sensor chip 56.

Figure 21:
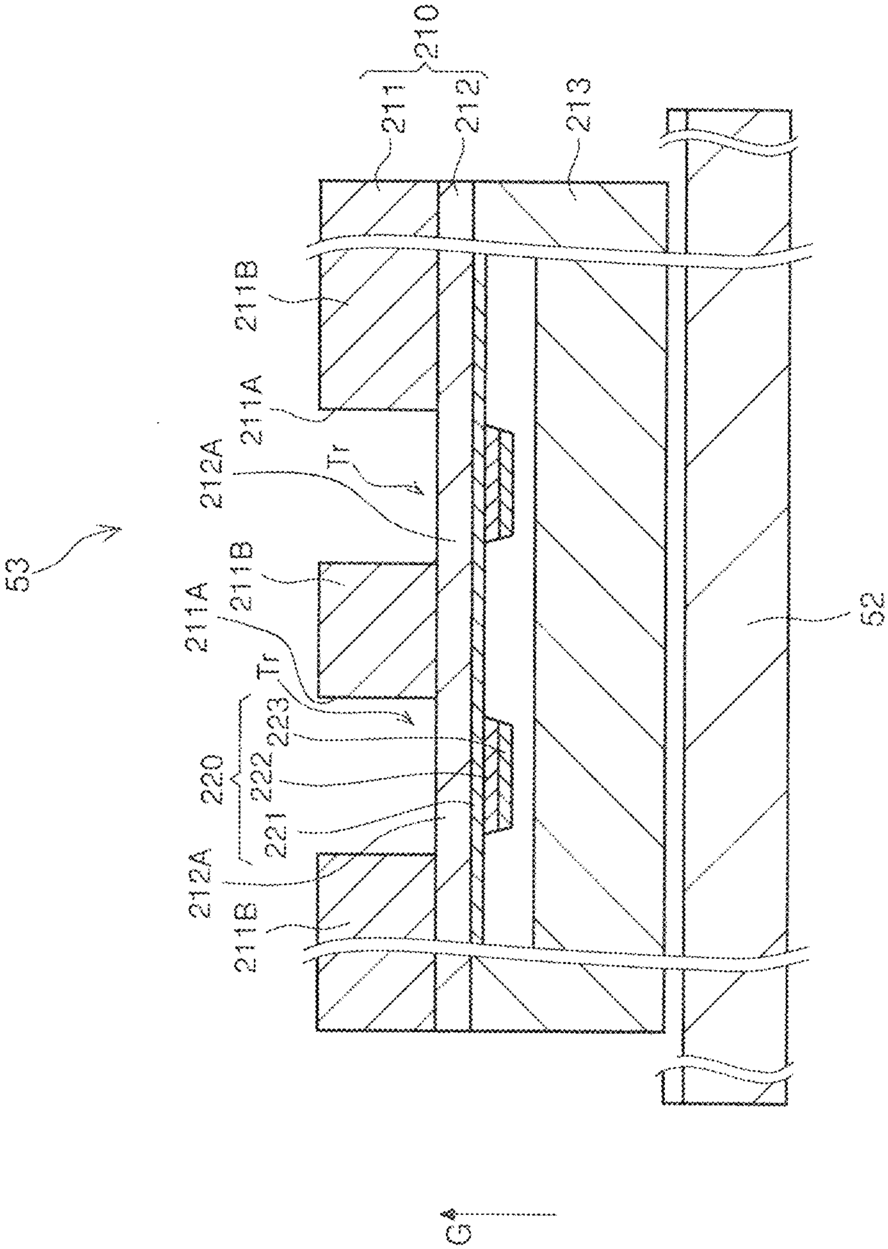
FIG. 21 is a cross-sectional view illustrating a structure of a transmission sensor chip.

Here, with reference to FIG. 21, a configuration of the transmission sensor chip 53 is described.

The transmission sensor chip 53 includes a base substrate 213, an element substrate 210, and a piezoelectric element 220.

The element substrate 210 includes a substrate main body portion 211 and a vibration plate 212 provided to one surface side of the substrate main body portion 211. Here, in the following description, a substrate thickness direction of the element substrate 210 is referred to as a G direction. The G direction is a direction in which an ultrasonic wave is transmitted, and is parallel to the sensor center axis Lx.

The substrate main body portion 211 is a substrate provided at the vibration plate 212, and is configured by a semiconductor substrate such as Si. An opening portion 211A that passes through the substrate main body portion 211 along the G direction is provided in the substrate main body portion 211.

The vibration plate 212 is supported by the base substrate 213. The vibration plate 212 and the base substrate 213 are bonded and fixed to each other. A space for arranging the piezoelectric element 220 is provided between the base substrate 213 and the vibration plate 212.

Note that the vibration plate 212 may be fixed while being stacked on the base substrate 213.

The vibration plate 212 is configured by $SiO_2$, a laminate body of $SiO_2$ and $GrO_2$, or the like, and is provided on the −G side of the substrate main body portion 211. The vibration plate 212 closes the −G side of the opening portion 211A. A portion of the vibration plate 212 that overlaps with the opening portion 211A as viewed in the G direction forms a vibration portion 212A.

The piezoelectric element 220 is provided at a position on the vibration plate 212 so as to overlap with each vibration portion 212A as viewed in the G direction. The piezoelectric element 220 is configured by stacking a first electrode 221, a piezoelectric film 222, and a second electrode 223 sequentially on the vibration plate 212.

Here, one vibration portion 212A and the piezoelectric element 220 provided on the vibration portion 212A form one ultrasonic transducer Tr. In the embodiment, although omitted in illustration, such ultrasonic transducers Tr are arranged in a two-dimensional array structure to form the transmission sensor chip 53. The transmission circuit 58 (see FIG. 3) is electrically coupled to each ultrasonic transducer Tr of the transmission sensor chip 53, and generates a driving signal for driving each ultrasonic transducer Tr.

In the transmission sensor chip 53, a pulse wave voltage having a predetermined frequency is applied between the first electrode 221 and the second electrode 223 of each of the ultrasonic transducers Tr. With this, the piezoelectric film 222 expands and contracts. With this, the vibration portion 212A vibrates at a frequency corresponding to an opening width of the opening portion 211A or the like, and an ultrasonic wave is transmitted from the vibration portion 212A toward the +G side along the sensor center axis Lx. In other words, the +G-side surface of the element substrate 210 is the ultrasonic transmission surface 53*a* of the transmission sensor chip 53.

Note that the base substrate 213 of the transmission sensor chip 53 is bonded to the transmission substrate 52 via a resist by a non-conductive adhesive. Further, at least one of a chip inclination prevention pat (omitted in illustration) for preventing inclination of the transmission sensor chip 53 with respect to the transmission substrate 52, a positioning mark portion (omitted in illustration) for positioning the transmission sensor chip 53 with respect to the transmission substrate 52, and an adhesive leakage prevention portion (omitted in illustration) for preventing leakage of a non-conductive adhesive is provided at the transmission substrate 52. Further, the transmission sensor chip 53 is bonded to the transmission substrate 52 by silver paste at a position different from the chip inclination prevention pat (omitted in illustration), and the chip inclination prevention pat (omitted in illustration) is not used for conduction.

Note that, although a configuration of the reception sensor chip 56 is omitted in illustration, the reception sensor chip 56 has a configuration similar to that of the transmission sensor chip 53. In such a case, the +G-side surface of the element substrate 210 is the ultrasonic reception surface 56*a* of the reception sensor chip 56. When an ultrasonic wave arrives at the ultrasonic transducer Tr, the vibration plate 212 vibrates according to the sound pressure of the ultrasonic wave. When the vibration plate 212 vibrates, the piezoelectric film 222 is deformed, and a potential difference is caused between the first electrode 221 and the second electrode 223. With this, the first electrode 221 of the ultrasonic transducer Tr outputs a reception signal corresponding to the sound pressure of the received ultrasonic wave. In other words, the ultrasonic wave is detected.

As the reception circuit 59 (FIG. 3) that processes the reception signal described above, a general circuit that processes a reception signal being input through reception of an ultrasonic wave may be used. For example, the reception circuit 59 may be configured by a band-pass filter, an amplifier, a sample-and-hold circuit, a comparator, or the like (omitted in illustration). Therefore, the reception circuit 59 may also be referred to as an amplifier in view of an amplification function.

Note that the ultrasonic detection unit 50 according to the embodiment includes a voltage application portion 51 that applies a bias voltage to the reception sensor chip 56. The voltage application portion 51 may be mounted on a dedicated substrate, may be mounted on the reception substrate 55, or may be a part of the control unit 80.

Here, when the ultrasonic detection unit 50 is calibrated, the reception sensor chip 56 receives an ultrasonic wave while a bias voltage is applied to the reception sensor chip 56, and the reception circuit 59 amplifies the reception signal. Calibration is performed by emitting an ultrasonic wave from the transmission sensor chip 53 without the document P. Based on the sound pressure of the ultrasonic wave received by the reception sensor chip 56 during the calibration, an output of an ultrasonic wave to be transmitted is adjusted.

When the piezoelectric element 220 is used in the reception sensor chip 56, a bias voltage is applied to the reception sensor chip 56. With this, variations in the polarization direction of the piezoelectric element 220 are less likely to occur, an efficient amplitude can be obtained, and an appropriate reception signal can be output.

Similarly, when the ultrasonic detection unit 50 detects double feeding of the documents P, the reception sensor chip 56 receives an ultrasonic wave while a bias voltage is applied to the reception sensor chip 56, and the reception circuit 59 amplifies the reception signal. With this, similarly, when double feeding of the documents P is detected, variations in the polarization direction of the piezoelectric element 220 are less likely to occur, an efficient amplitude can be obtained, and an appropriate reception signal can be output.

Configurations of Transmission Sensor Unit and Reception Sensor Unit

Next, configurations of the transmission unit 50A and the reception unit 50B are described.

FIG. 4 illustrates a state in which the second unit 4 is opened with respect to the first unit 3. When the second unit 4 is opened with respect to the first unit 3, the inside of the first unit 3 and the inside of the second unit 4 are exposed.

A transmission-side path formation member 36 is provided to the inside of the first unit 3. When the second unit 4 is opened with respect to the first unit 3, the transmission-side path formation member 36 is exposed.

Further, a reception-side path formation member 39 is provided to the inside of the second unit 4. When the second unit 4 is opened with respect to the first unit 3, the reception-side path formation member 39 is exposed.

The transmission-side path formation member 36 and the reception-side path formation member 39 form a part of the upstream feeding path R0, the downstream feeding path R1, and the reading transport path R2.

Figure 5:
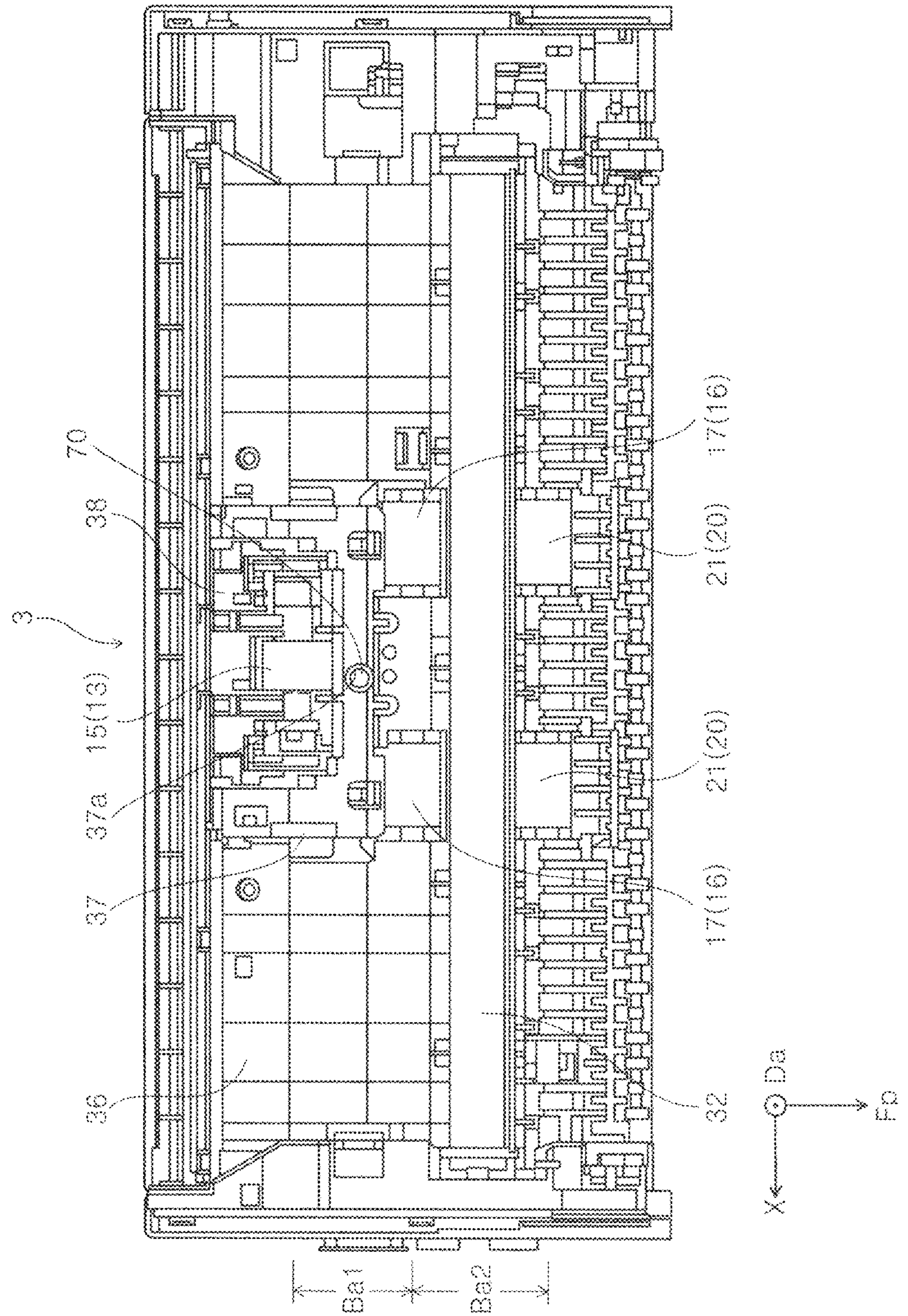
FIG. 5 is a plan view of the first unit.

As illustrated in FIG. 5, the transmission-side path formation member 36 is provided with a cover 37. The cover 37 is provided to be attachable to and removable from to the transmission-side path formation member 36 as in an attached state illustrated in FIG. 5 and FIG. 6 and a removed state illustrated in FIG. 7. The cover 37 is provided to be attachable to the transmission-side path formation member 36 by a snap-fit structure (omitted in illustration).

An opening 37*a* having a circular shape is formed in the cover 37, and is configured so that the sensor center axis Lx of the ultrasonic detection unit 50 passes through the vicinity of the center of the opening 37*a*. A part of a first protection member 70, which is described later, is exposed on the inside of the opening 37*a*.

Figure 6:
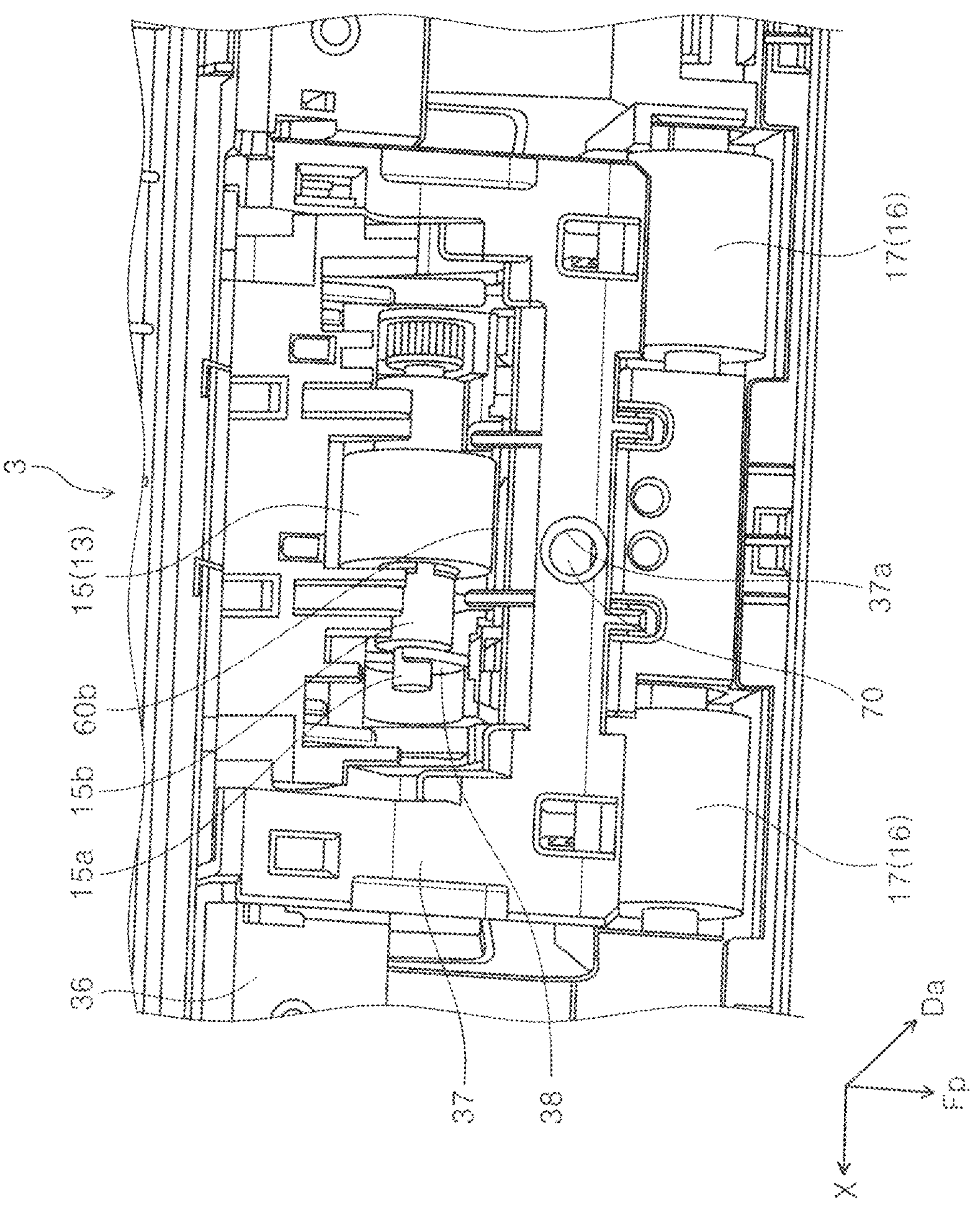
FIG. 6 is a perspective view of a state in which a cover provided to the first unit is attached.
Figure 7:
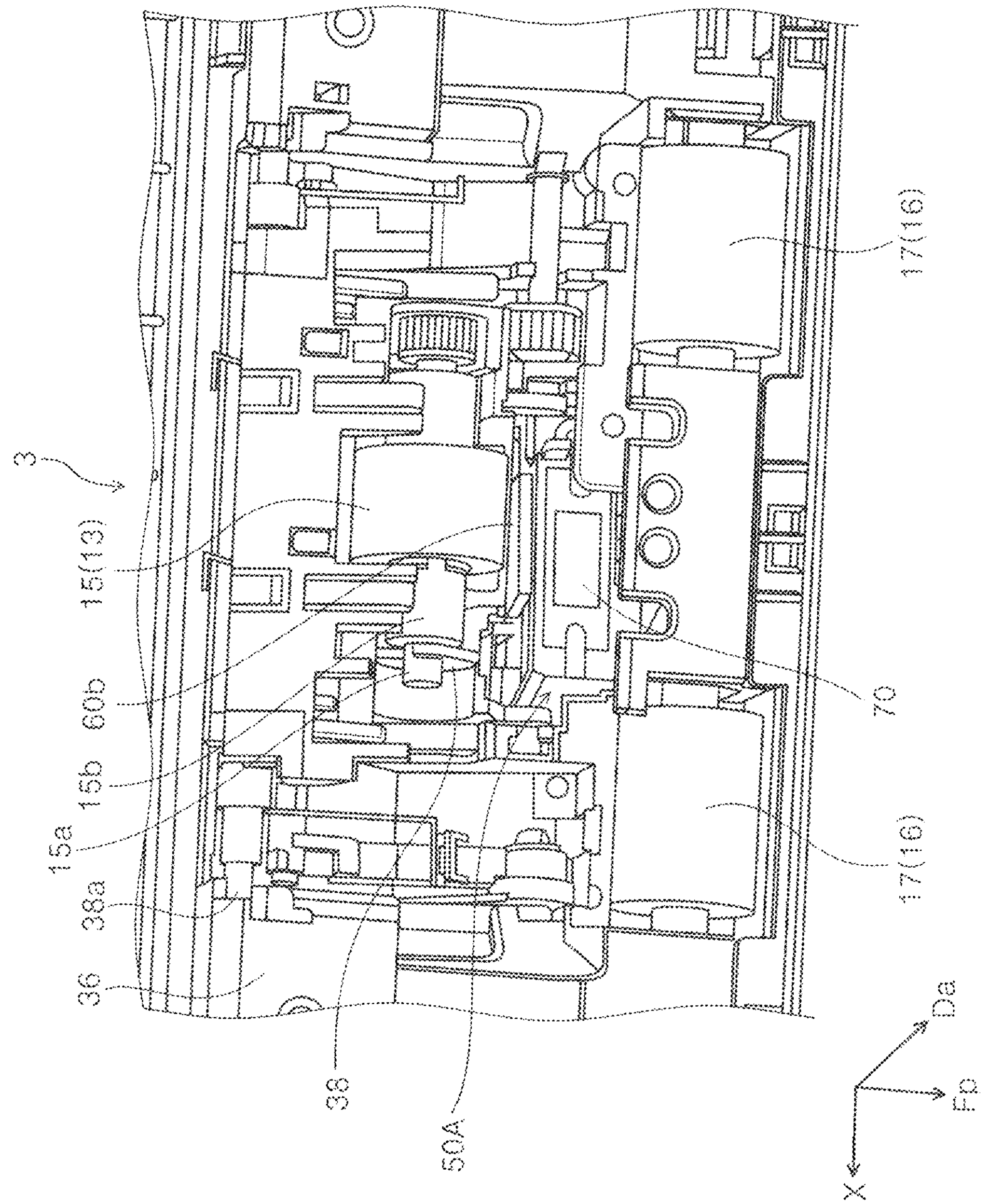
FIG. 7 is a perspective view of a state in which the cover provided to the first unit is removed.

The transmission unit 50A is provided on the inside of provided the cover 37. As illustrated in FIG. 7, when the cover 37 is removed, the transmission unit 50A is exposed. Note that, as illustrated in FIG. 6, when the cover 37 is attached, a part of the transmission unit 50A is also exposed. When the cover 37 is removed, the transmission unit 50A is further largely exposed. When the cover 37 is attached as illustrated in FIG. 6, a part of a first wall portion 60*b* of a transmission substrate holder 60, which is described later, is exposed.

Note that a roller holding member 38 that holds the separation roller 15 is provided to the inside of the cover 37. When the cover 37 is removed, the roller holding member 38 can be removed, and the separation roller 15 can be replaced together with the roller holding member 38.

Note that, in FIG. 6, the reference symbol 15*a* is a rotary shaft of the separation roller 15, and the reference symbol 15*b* is a torque limiter that applies a separation torque to the separation roller 15.

Note that, in FIG. 5, the reference symbol Ba1 is an inter-axial distance between the rotary shaft center of the separation roller 15 and the rotary shaft center of the second lower roller 17, in other words, an inter-axial distance, and the reference symbol Ba2 is a distance between the rotary shaft center of the second lower roller 17 and the rotary shaft center of the third lower roller 21, in other words, an inter-axial distance.

In the embodiment, the inter-axial distance Ba1 is shorter than the inter-axial distance Ba2. In other words, the path length of the downstream feeding path R1 is shorter than the path length of the reading transport path R2.

Note that, in the embodiment, the inter-axial distance Ba1 is 29.1 mm, and the inter-axial distance Ba2 is 34.0 mm.

Figure 8:
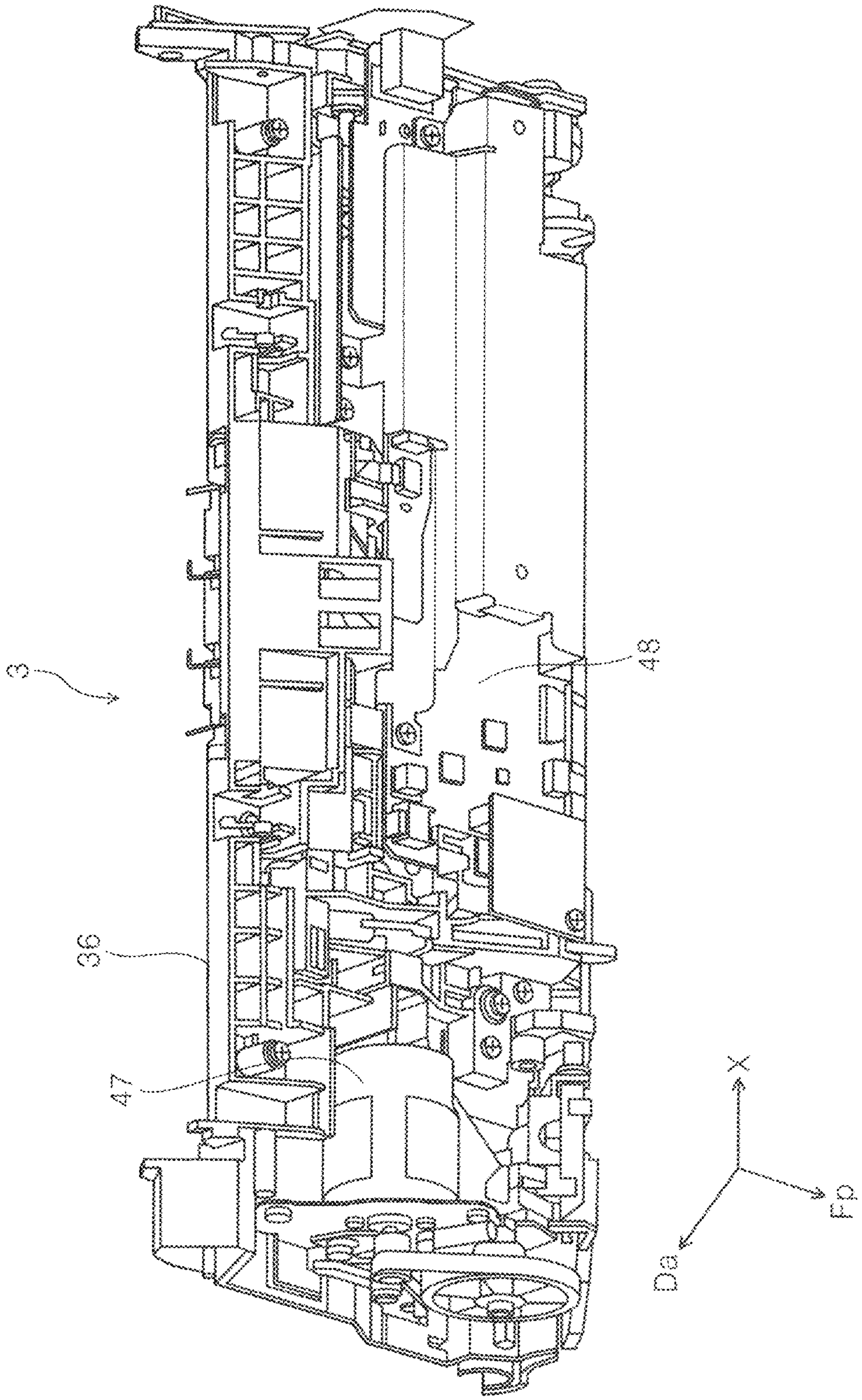
FIG. 8 is a perspective view of the first unit as viewed from the back side.

Next, as illustrated in FIG. 8, the transport motor 47 and a main substrate 48 are provided on a side of the transmission-side path formation member 36 in the −Da direction. The transport motor 47 is provided at the end of the transmission-side path formation member 36 in the −X direction on the back surface side.

Figure 9:
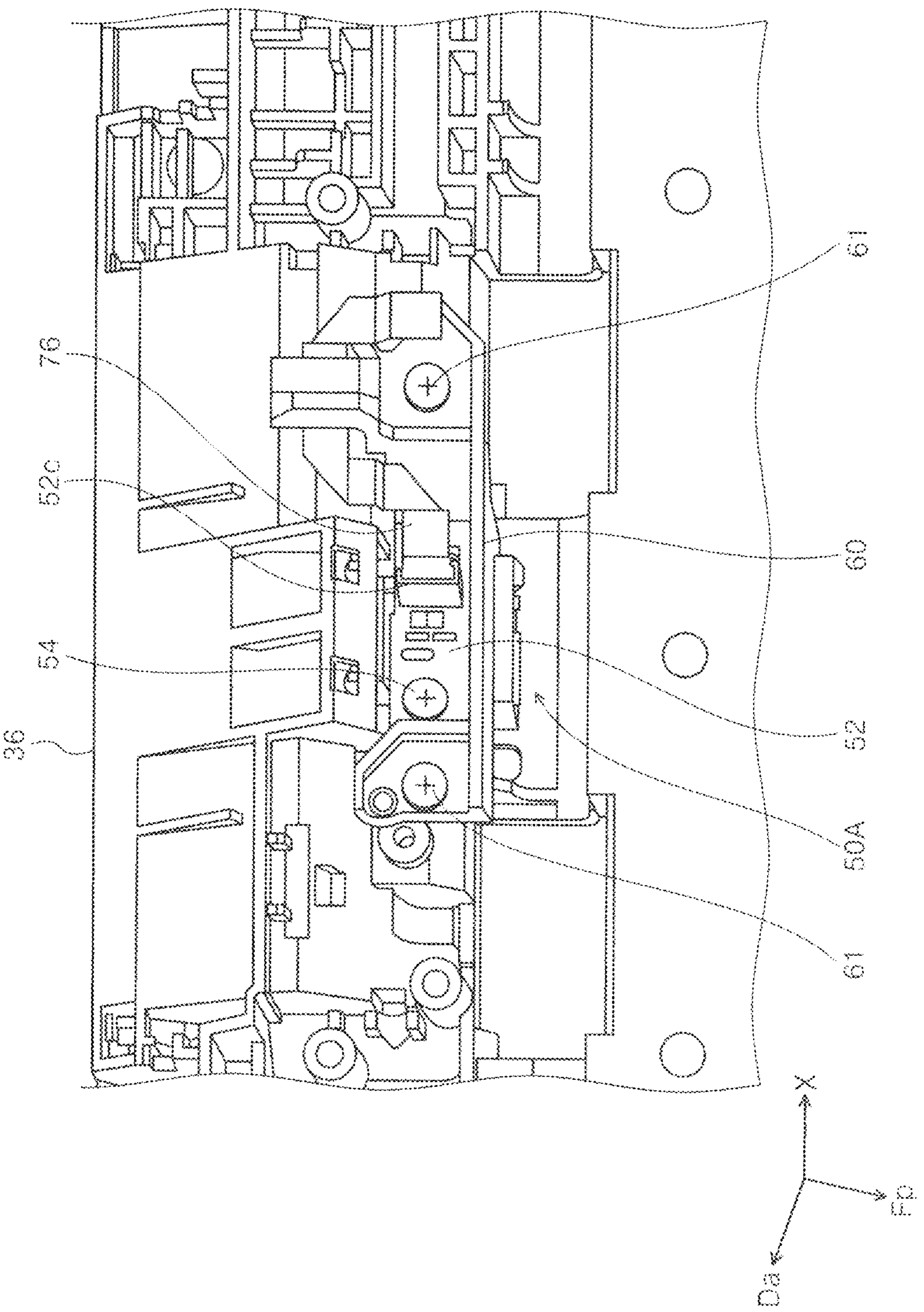
FIG. 9 is a perspective view illustrating a fixed state of a transmission substrate holder.

The main substrate 48 forms the control unit 80 described above. As illustrated in FIG. 9, the transmission unit 50A is provided between the main substrate 48 and the transmission-side path formation member 36.

A configuration of the transmission unit 50A is described later in detail. The transmission unit 50A includes the transmission substrate holder 60 as a base body, and the transmission substrate holder 60 is fixed to the transmission-side path formation member 36 by screws 61 and 61.

Figure 10:
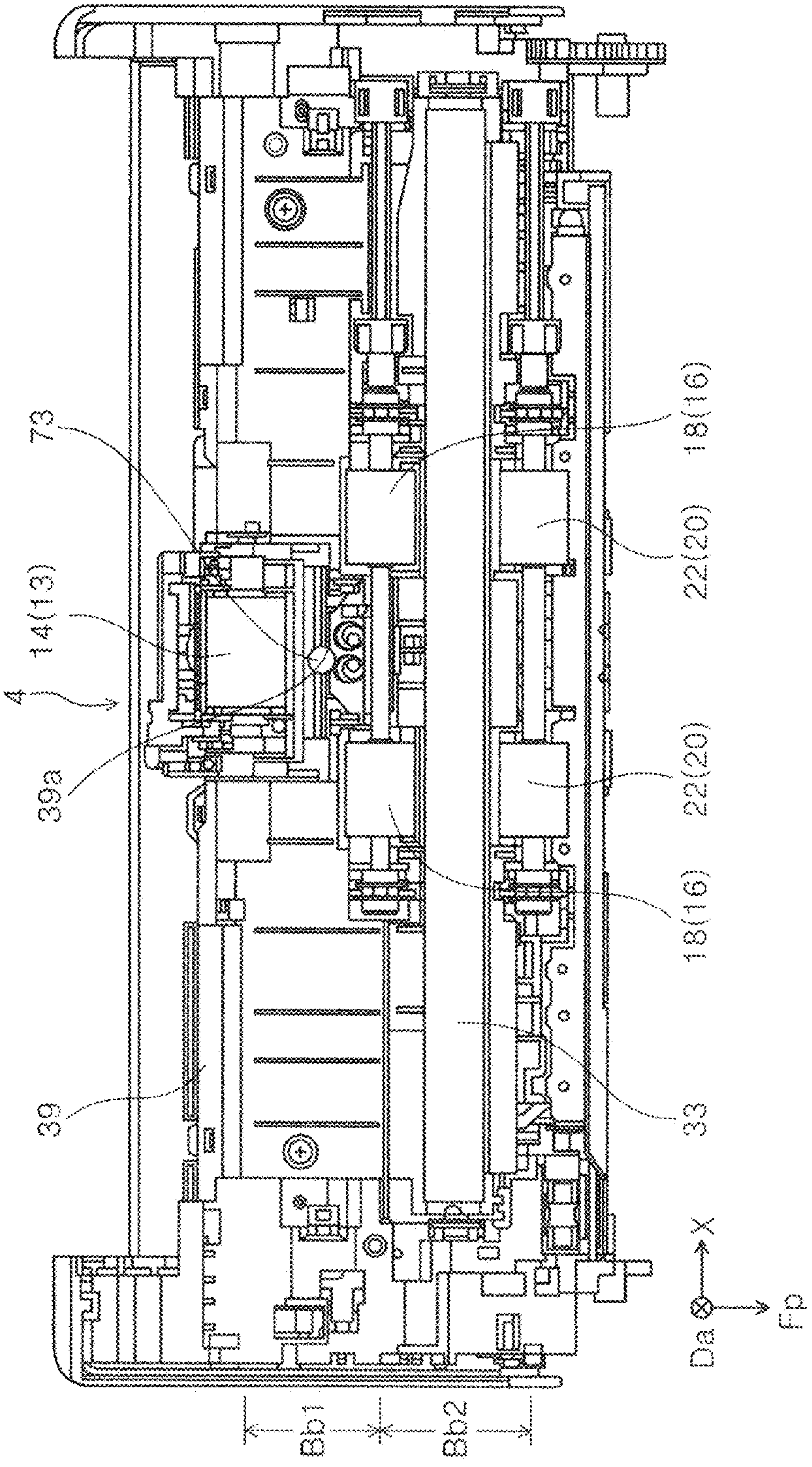
FIG. 10 is a plan view of the second unit.

Next, as illustrated in FIG. 10, an opening 39*a* having a circular shape is formed in the reception-side path formation member 39, and is configured so that the sensor center axis Lx of the ultrasonic detection unit 50 passes through the vicinity of the center of the opening 39*a*. A part of a second protection member 73, which is described later, is exposed on the inside of the opening 39*a*. Note that, in FIG. 10, the reference symbol Bb1 is a distance between the rotary shaft center of the feeding roller 14 and the rotary shaft center of the second upper roller 18, in other words, an inter-axial distance, and the reference symbol Bb2 is a distance between the rotary shaft center of the second upper roller 18 and the rotary shaft center of the third upper roller 22, in other words, an inter-axial distance.

In the embodiment, the inter-axial distance Bb1 is shorter than the inter-axial distance Bb2. In other words, the path length of the downstream feeding path R1 is shorter than the path length of the reading transport path R2.

Note that, in the embodiment, the inter-axial distance Bb1 is 30.0 mm, and the inter-axial distance Bb2 is 34.0 mm.

Figure 11:
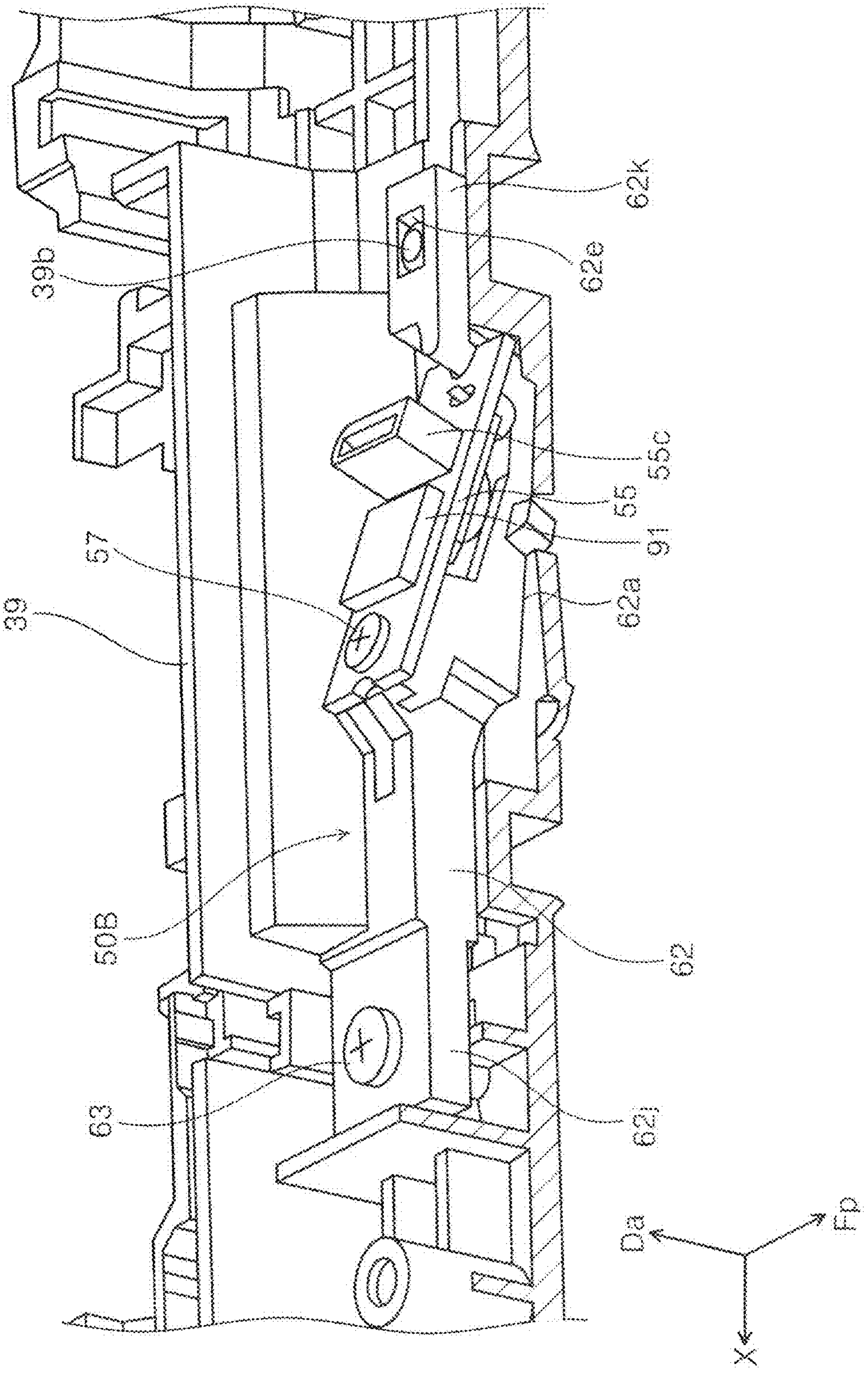
FIG. 11 is a perspective view illustrating a fixed state of a reception substrate holder.

As illustrated in FIG. 11, the reception unit 50B is provided on a side of the reception-side path formation member 39 in the +Da direction.

A configuration of the reception unit 50B is described later in detail. The reception unit 50B includes a reception substrate holder 62 as a base body, and a fixed portion 62*j* being a portion forming the reception substrate holder 62 is fixed to the reception-side path formation member 39 by a reception-side holder fixing screw 63. Note that the reference symbol 39*b* is a positioning portion provided to the reception-side path formation member 39. When the positioning portion 39*b* is fitted into a hole portion 62*e* formed in a positioned portion 62*k* of the reception substrate holder 62, the positioned portion 62*k* is positioned with respect to the reception-side path formation member 39.

In this manner, the reception substrate holder 62 is positioned and fixed with respect to the reception-side path formation member 39.

Next, configurations of the transmission unit 50A and the reception unit 50B are further described with reference to FIG. 12 and the subsequent figures.

Figure 12:
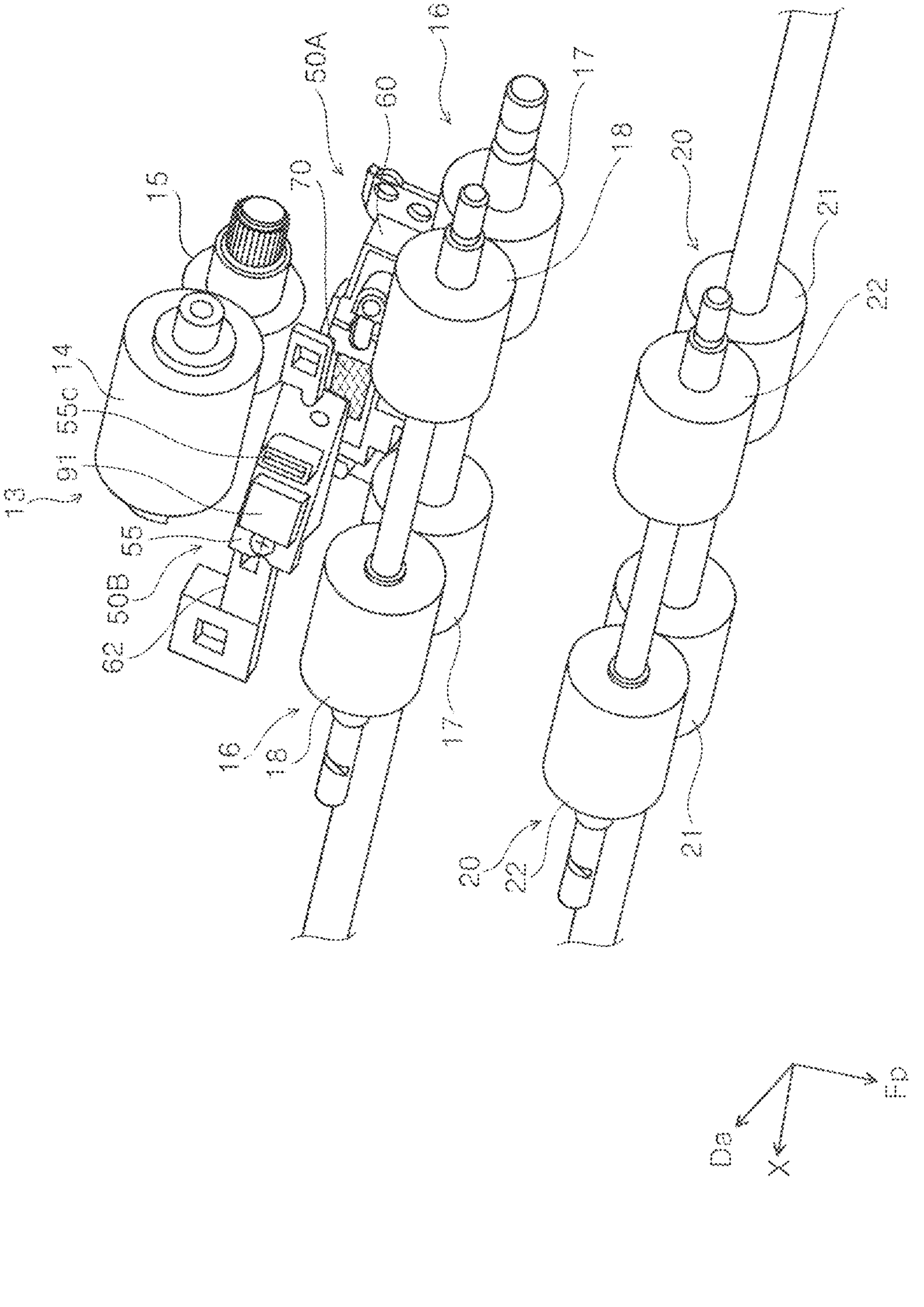
FIG. 12 is a perspective view illustrating a positional relationship between the first roller pair, the second roller pair, the third roller pair, and the ultrasonic detection unit.

As illustrated in FIG. 12, the ultrasonic detection unit 50 is arranged in a space between the first roller pair 13 and the second roller pair 16. Along the transport direction Fp, the separation roller 15, the transmission unit 50A forming the first roller pair 13, the second lower roller 17 forming the second roller pair 16, and the third lower roller 21 forming the third roller pair 20 are arranged in the stated order. Further, along the transport direction Fp, the feeding roller 14 forming the first roller pair 13, the reception unit 50B, the second upper roller 18 forming the second roller pair 16, and the third upper roller 22 forming the third roller pair 20 are arranged in the stated order.

Figure 13:
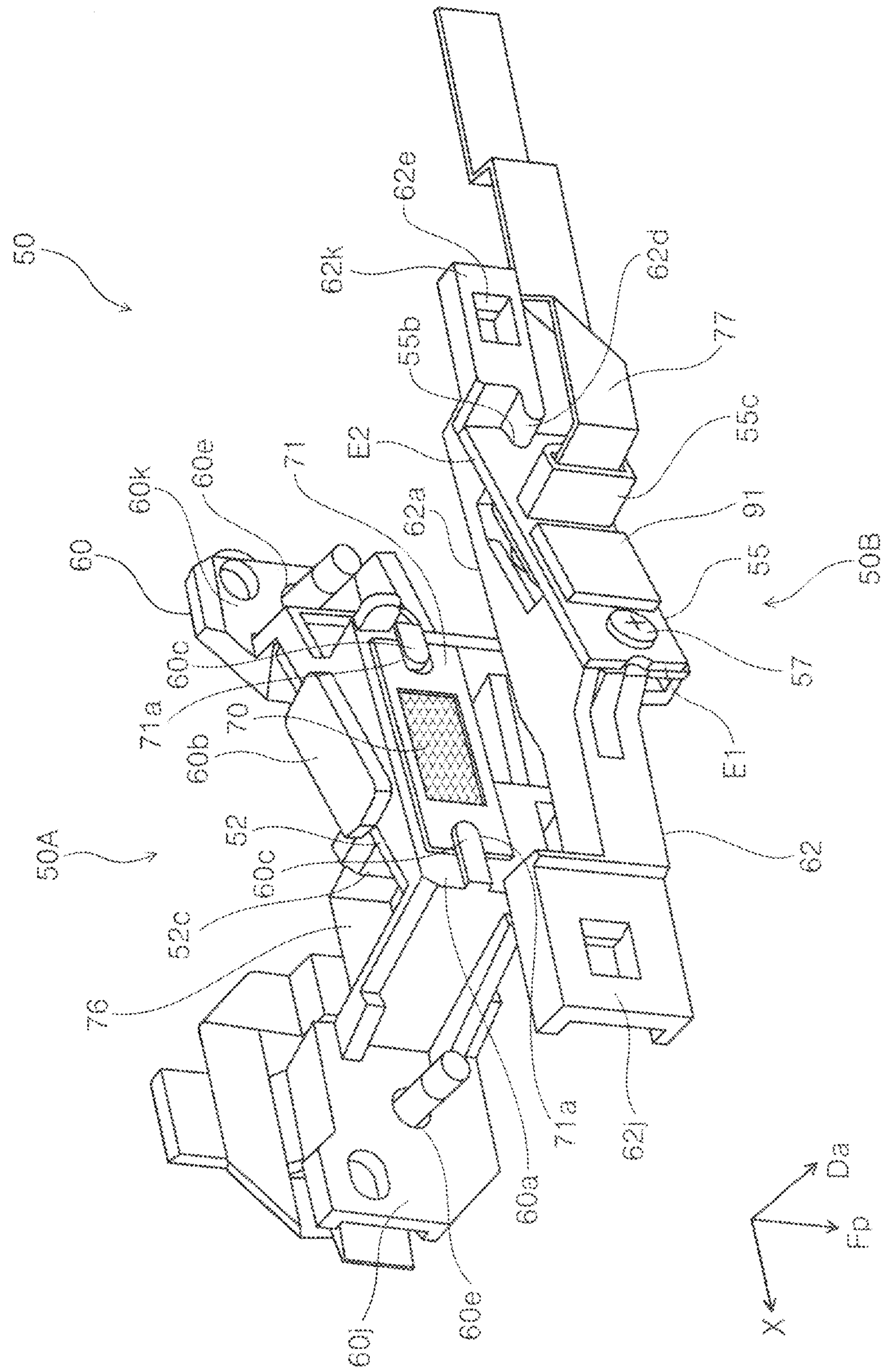
FIG. 13 is a perspective view of the ultrasonic detection unit.
Figure 14:
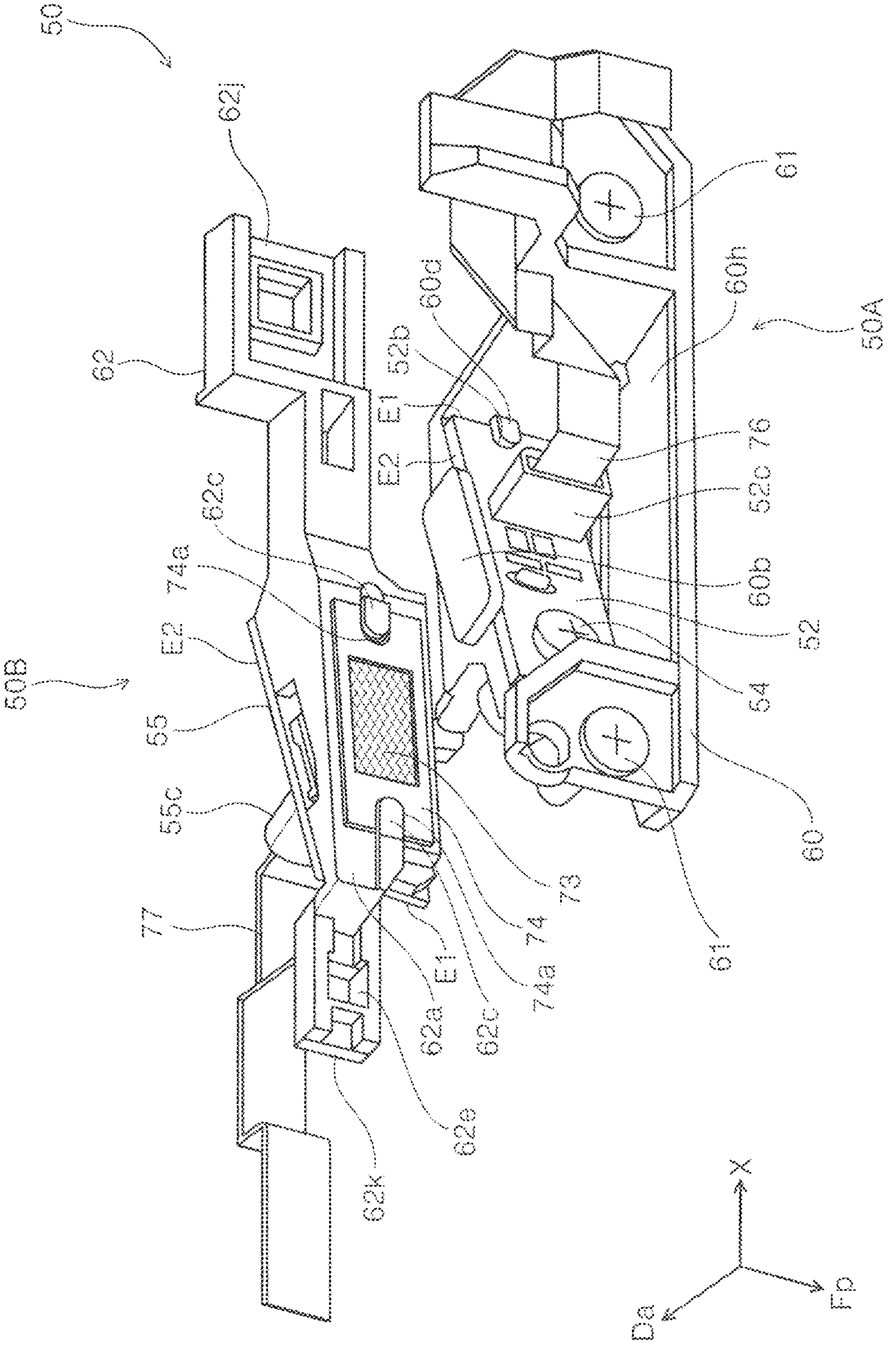
FIG. 14 is a perspective view of the ultrasonic detection unit.

As illustrated in FIG. 13 and FIG. 14, the transmission unit 50A is configured by providing the transmission substrate 52 and the first protection member 70 to the transmission substrate holder 60.

Similarly, the reception unit 50B is configured by providing the reception substrate 55 and the second protection member 73 to the reception substrate holder 62.

Figure 17:
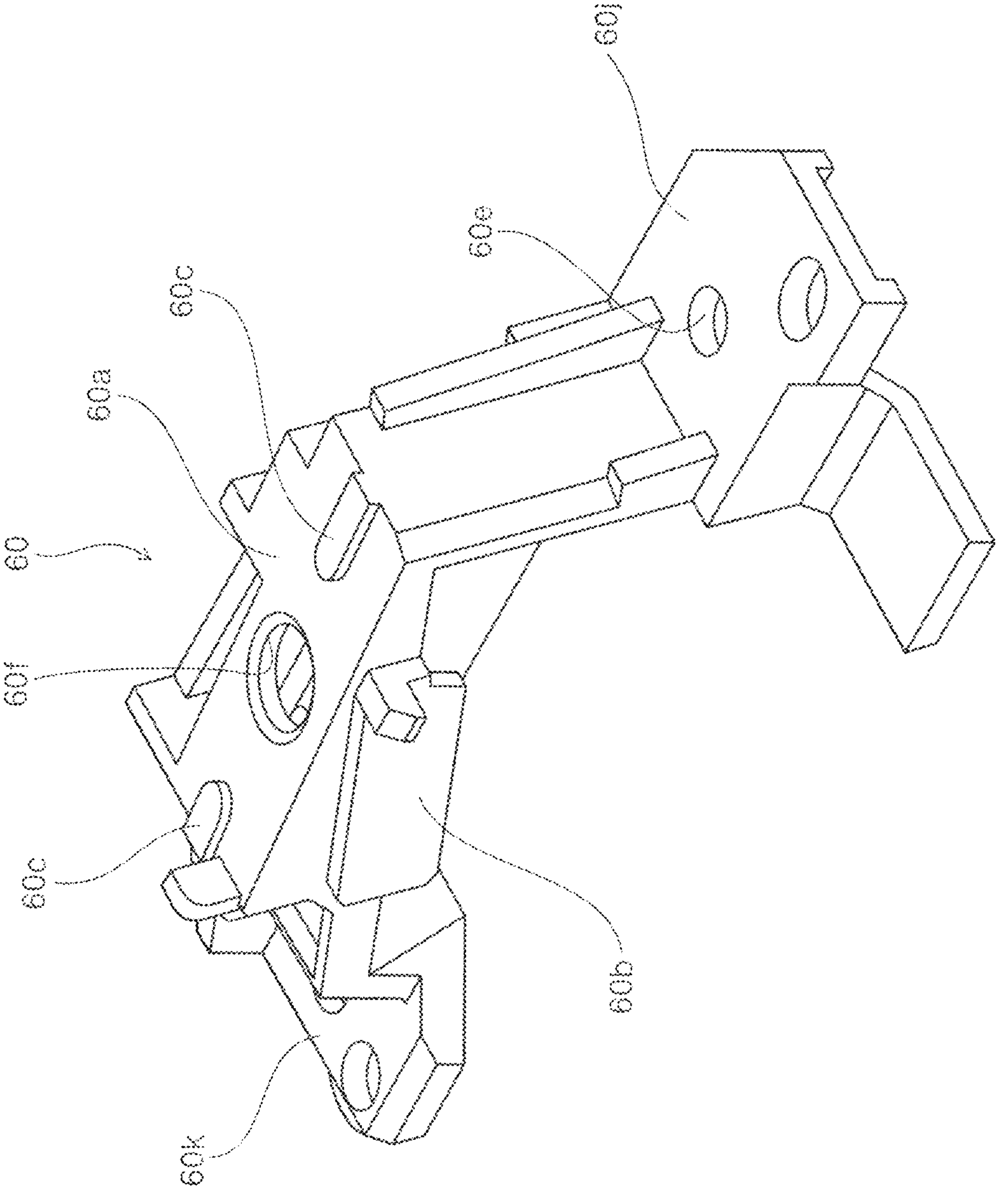
FIG. 17 is a perspective view of the transmission substrate holder.
Figure 18:
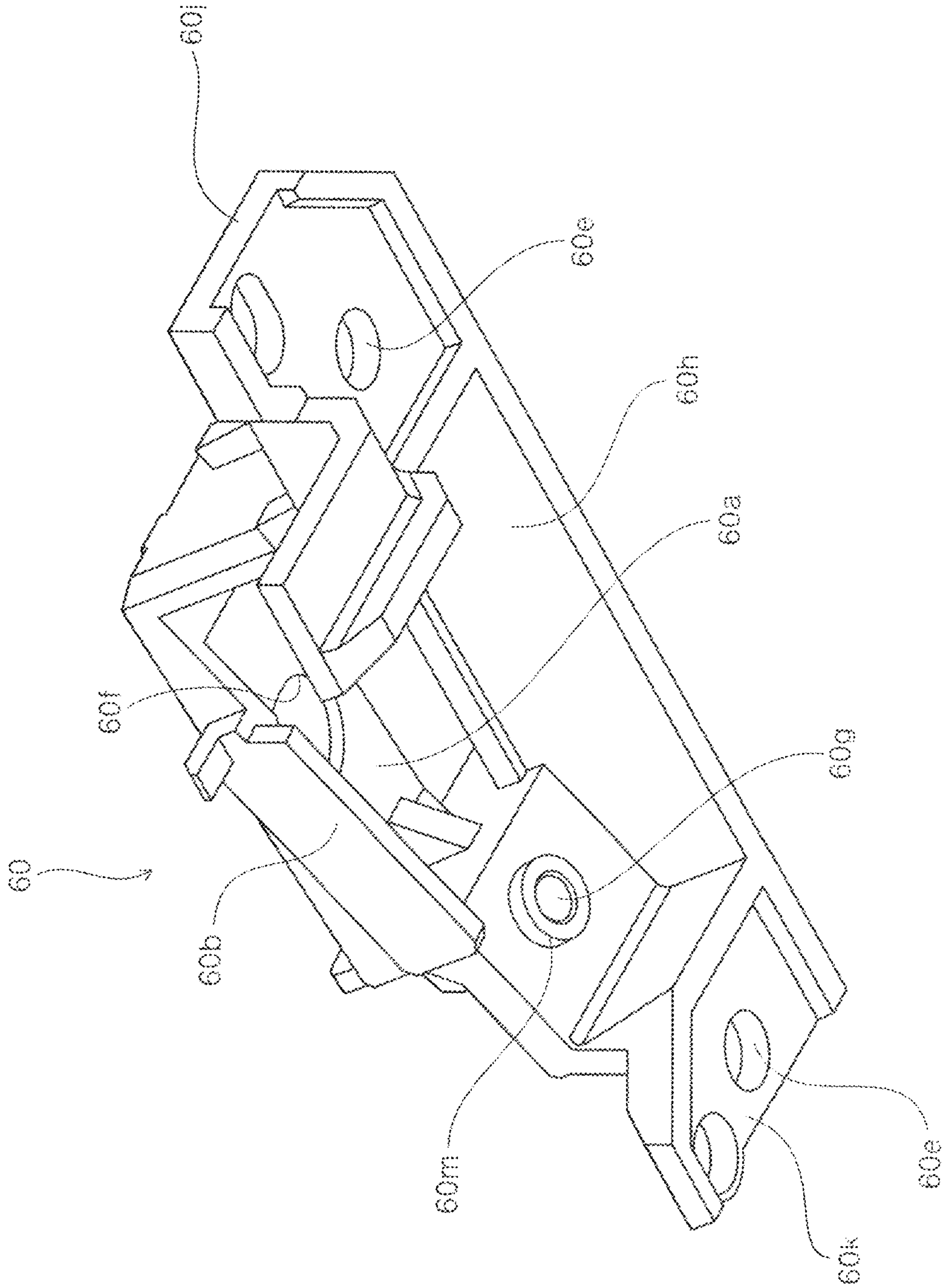
FIG. 18 is a perspective view of the transmission substrate holder.

As illustrated in FIG. 17 and FIG. 18, the transmission substrate holder 60 includes screw holes 60*e* respectively for screw fixing portions 60*j* and 60*k*, and the screws 61, which are described with reference to FIG. 9, pass through the screw holes 60*e*. A fixing portion 60*a* is formed to be positioned in the +Da direction with respect to the screw fixing portions 60*j* and 60*j* between the screw fixing portion 60*j* and the screw fixing portion 60*k*. The fixing portion 60*a* is a portion for fixing the first protection member 70, and a first opening 60*f* is formed at the center portion (see FIG. 17 and FIG. 18 and FIG. 22). The first opening 60*f* is formed so that the sensor center axis Lx of the ultrasonic detection unit 50 passes through the vicinity of the center of the first opening 60*f*.

Figure 19:
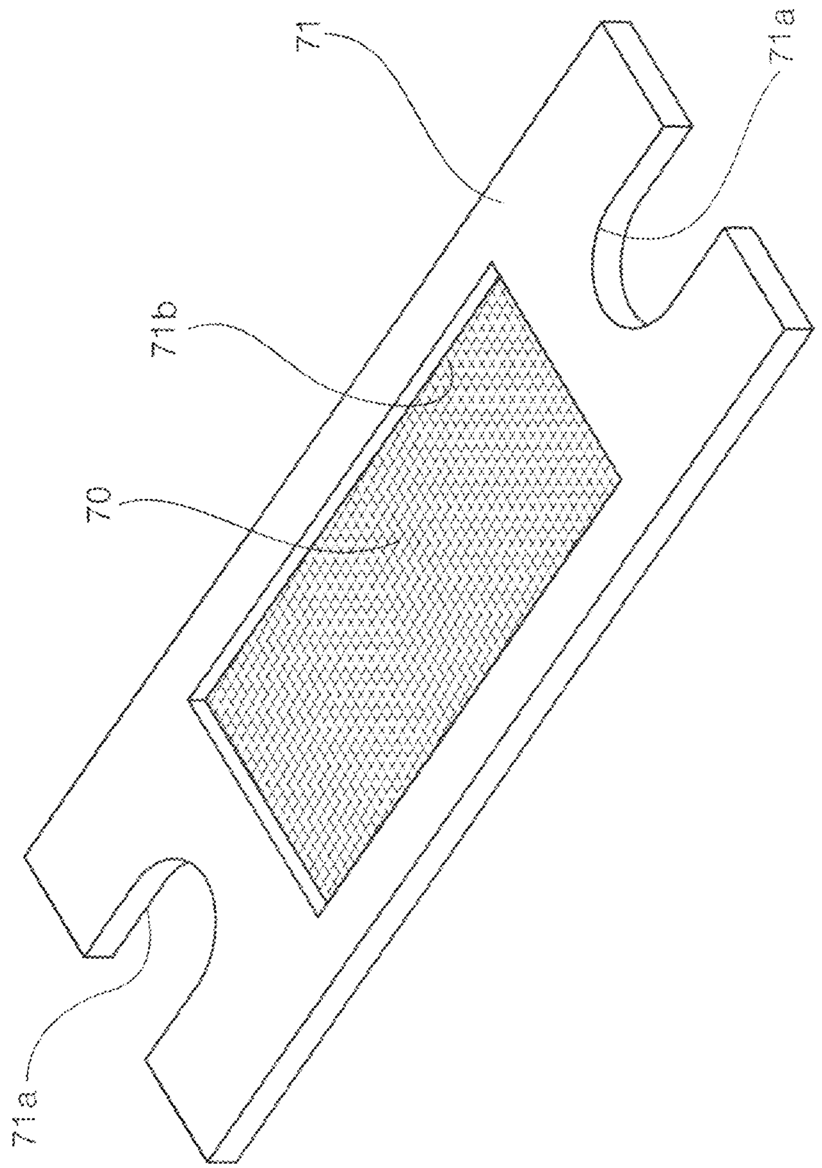
FIG. 19 is a perspective view of a protection member.

Protection member positioning portions 60*c* and 60*c* are formed on the surface of the fixing portion 60*a*. As illustrated in FIG. 19, the first protection member 70 is held by a first holding member 71, and recessed portions 71*a* and 71*a* are formed in the first holding member 71. When the protection member positioning portions 60*c* and 60*c* are fitted into the recessed portions 71*a* and 71*a*, the first holding member 71, in other words, the first protection member 70 is positioned with respect to the fixing portion 60*a*.

As illustrated in FIG. 18, a protrusion portion 60*m* having a cylindrical shape is formed on the back side of the fixing portion 60*a*, and a screw hole 60*g* is formed in the protrusion portion 60*m*. Further, as illustrated in FIG. 14, a substrate positioning portion 60*d* is formed on the back side of the fixing portion 60*a*.

Figure 15:
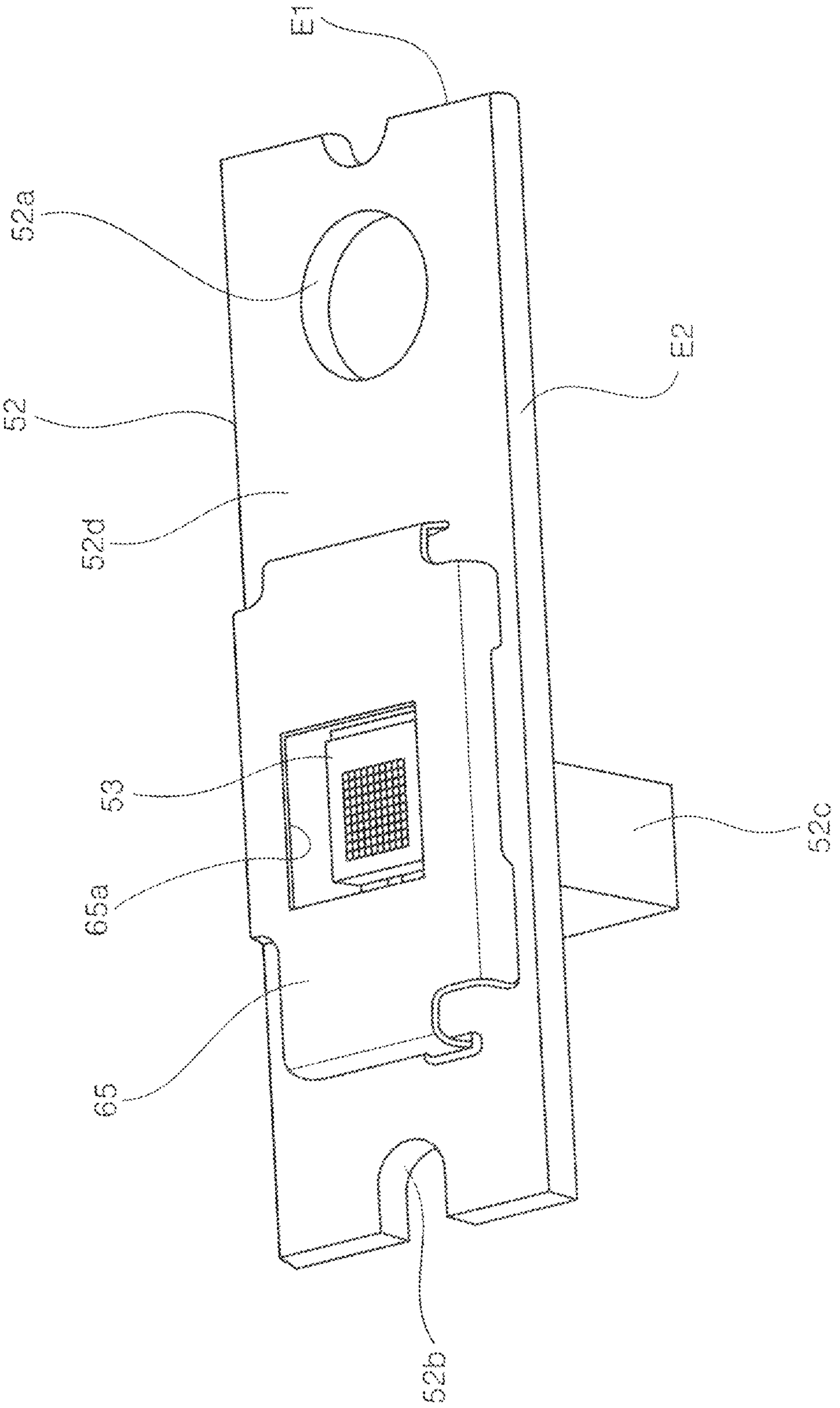
FIG. 15 is a perspective view of a transmission substrate.

As illustrated in FIG. 15, an opening 52*a* and a recessed portion 52*b* are formed in the transmission substrate 52. The protrusion portion 60*m* of the transmission substrate holder 60 is fitted into the opening 52*a*, and the substrate positioning portion 60*d* of the transmission substrate holder 60 is fitted into the recessed portion 52*b*. With this, the transmission substrate 52 is positioned with respect to the transmission substrate holder 60. Further, as illustrated in FIG. 14, a transmission substrate fixing screw 54 is fitted into the screw hole 60*g* (FIG. 18). In this manner, the transmission substrate 52 is fixed with respect to the transmission substrate holder 60.

The transmission substrate holder 60 holds the transmission substrate 52 so that the transmission surface 53*a* of the transmission sensor chip 53 is inclined at an angle α1 with respect to the document surface S as illustrated in FIG. 22. With this, the transmission surface 53*a* of the transmission sensor chip 53 and the reception surface 56*a* of the reception sensor chip 56 are parallel to each other, and the sensor center axis Lx is inclined at the angle β with respect to the document surface S.

Note that, as illustrated in FIG. 13, FIG. 14, FIG. 17, and FIG. 18, the first wall portion 60*b* is formed upstream of the fixing portion 60*a* in the transport direction Fp, and a second wall portion 60*h* is formed downstream of the fixing portion 60*a* in the transport direction Fp.

As illustrated in FIG. 6, the first wall portion 60*b* is at a position so that the first wall portion 60*b* can be seen from the outside while the cover 37 is closed, and includes a function of protecting the transmission substrate 52 from a foreign matter, a liquid, or the like.

Although omitted in illustration, the first wall portion 60*b* is at a position overlapping with a part of the transmission substrate 52 and the entire transmission sensor chip 53 as viewed from upstream in the transport direction Fp. In other words, the first wall portion 60*b* is at such a position that a part of the transmission substrate 52 and the entire transmission sensor chip 53 are hidden by the first wall portion 60*b* as viewed from upstream in the transport direction Fp.

Next, the reception substrate holder 62 includes the fixed portion 62*j* and the positioned portion 62*k* which are described with reference to FIG. 11, and a fixing portion 62*a* is formed between the fixed portion 62*j* and the positioned portion 62*k* so as to be positioned in the −Da direction with respect to the fixed portion 62*j* and the positioned portion 62*k*. The fixing portion 62*a* is a portion for fixing the second protection member 73, and a second opening 62*f* is formed at the center portion (see FIG. 22). The second opening 62*f* is formed so that the sensor center axis Lx of the ultrasonic detection unit 50 passes through the vicinity of the center of the second opening 62*f*.

As illustrated in FIG. 14, protection member positioning portions 62*c* and 62*c* are formed on the surface of the fixing portion 62*a*. The second protection member 73 is held by a second holding member 74, and recessed portions 74*a* and 74*a* are formed in the second holding member 74. When the protection member positioning portions 62*c* and 62*c* are fitted into the recessed portions 74*a* and 74*a*, the second holding member 74, in other words, the second protection member 73 is positioned with respect to the fixing portion 62*a*.

As illustrated in FIG. 13, a substrate positioning portion 62*d* having a protrusion shape is formed on the back side of the fixing portion 62*a*. A recessed portion 55*b* is formed in the reception substrate 55. The substrate positioning portion 62*d* is fitted into the recessed portion 55*b*. Further, although omitted in illustration, a protrusion portion and a screw hole which are similar to the protrusion portion 60*m* and the screw hole 60*g* of the transmission substrate holder 60, respectively, are formed at the reception substrate holder 62. Further, an opening similar to the opening 52*a* of the transmission substrate 52 (see FIG. 15) is formed in the reception substrate 55. Further, the protrusion portion of the reception substrate holder 62 is fitted into the opening, and the substrate positioning portion 62*d* of the reception substrate holder 62 is fitted into the recessed portion 55*b* of the reception substrate 55. With this, the reception substrate 55 is positioned with respect to the reception substrate holder 62. Further, as illustrated in FIG. 13, a reception substrate fixing screw 57 is fitted into the screw hole described above. With this, the reception substrate 55 is fixed with respect to the reception substrate holder 62.

The reception substrate holder 62 holds the reception substrate 55 so that the reception surface 56*a* of the reception sensor chip 56 is inclined at the angle α1 with respect to the document surface S as illustrated in FIG. 22. With this, the reception surface 56*a* of the reception sensor chip 56 and the transmission surface 53*a* of the transmission sensor chip 53 are parallel to each other, and the sensor center axis Lx is inclined at the angle β with respect to the document surface S.

As described above, in the embodiment, the transmission substrate 52 is fixed to the transmission-side path formation member 36, which is a member forming the document transport path, via the transmission substrate holder 60, and the reception substrate 55 is fixed to the reception-side path formation member 39, which is a member forming the document transport path, via the reception substrate holder 62. With this, a distance between the document P and the transmission sensor chip 53 and a distance between the document P and the reception sensor chip 56 are stabilized, and a detection value of an ultrasonic wave is stabilized.

Next, a configuration of the transmission substrate 52 is described.

As illustrated in FIG. 13 to FIG. 15, the transmission substrate 52 is a rectangular substrate having short sides E1 and long sides E2. As described above, the recessed portion 52*b* is formed at one of the short sides E1. The transmission substrate 52 is provided so that the short side E1 extends along the transport direction Fp.

The transmission sensor chip 53 is fixed while being placed on a substrate surface 52*d* of the transmission substrate 52. No other member, such as a pedestal, is interposed between the transmission sensor chip 53 and the substrate surface 52*d*, except for an adhesive.

A connector 52*c* is provided on a side opposite to the substrate surface 52*d* of the transmission substrate 52, and a transmission-side cable 76 (see FIG. 13 and FIG. 14) is connected to the connector 52*c*.

Further, the substrate surface 52*d* of the transmission substrate 52 is provided with a first surrounding member 65. In the embodiment, the first surrounding member 65 is formed of a metal plate material, and is fixed to the transmission substrate 52 by an adhesive.

Figure 16:
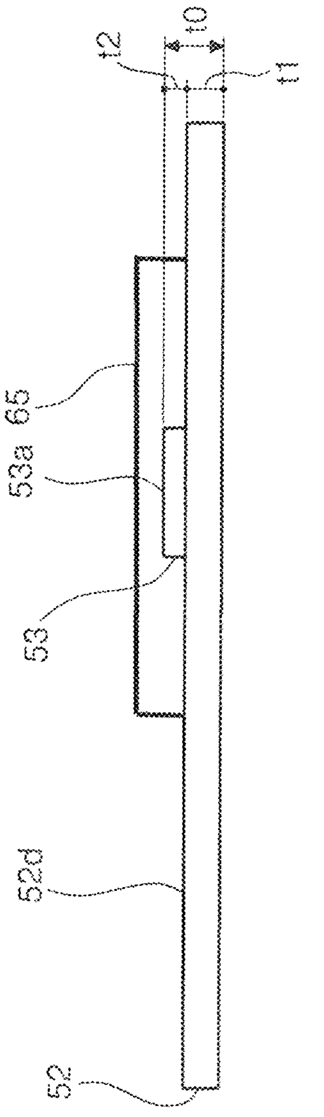
FIG. 16 is a side view of the transmission substrate.

An opening 65*a* is formed in the first surrounding member 65, and the opening 65*a* is formed so that the sensor center axis Lx of the ultrasonic detection unit 50 passes through the vicinity of the center of the opening 65*a*. The first surrounding member 65 is provided to extend along the substrate surface 52*d* as illustrated in FIG. 16.

The transmission substrate fixing screw 54 includes a head portion including a driver fitting hole, a screw portion including a male screw, and a distal end portion of a distal end of the male screw. The screw portion is attached to an attached portion on the same side of the transmission sensor chip 53, specifically, the screw hole 60*g* (see FIG. 18 and FIG. 22) in the substrate surface 52*d* of the transmission substrate 52. Note that the screw portion may be attached to an attached portion on a side opposite to a transmission sensor chip 53, in other words, a screw hole in the substrate surface 52*d* of the transmission substrate 52.

While the transmission substrate 52 is fixed to the transmission substrate holder 60, a position of a distal end portion 54*a* of the transmission substrate fixing screw 54 is located in the −Da direction with respect to a most +Da-direction position 65*b* of the first surrounding member 65 in the normal direction Da.

Further, a direction extending along the sensor center axis Lx from the transmission unit 50A to the reception unit 50B is a +Lx direction, and a direction opposite thereto is a −Lx direction. While the transmission substrate 52 is fixed to the transmission substrate holder 60, the position of the distal end portion 54*a* of the transmission substrate fixing screw 54 is positioned in the +Lx direction with respect to the first surrounding member 65.

Further, a distance from the substrate surface 52*d* of the transmission substrate 52 to the first surrounding member 65 is less than a length of the screw portion of the transmission substrate fixing screw 54.

In FIG. 16, the reference symbol t0 is a thickness including the transmission substrate 52 and the transmission sensor chip 53, the reference symbol t1 is a thickness of the transmission substrate 52, and the reference symbol t2 is a thickness of the transmission sensor chip 53. The thickness t2 of the transmission sensor chip 53 is less than the thickness of the transmission substrate 52.

As an example, the thickness of the transmission substrate 52 may be 0.8 to 1.2 mm, in particular, 1.0 mm. Further, as an example, the thickness of the transmission sensor chip 53 may be 0.5 to 0.7 mm, in particular, 0.578 mm.

As an example, the distance from the substrate surface 52*d* of the transmission substrate 52 to the first surrounding member 65 may be 1.2 to 1.6 mm, in particular, 1.4 mm.

Next, a configuration of the reception substrate 55 is described.

In the embodiment, as illustrated in FIG. 13 and FIG. 14, the shape and the dimension of the reception substrate 55 are similar to those of the transmission substrate 52.

In other words, the reception substrate 55 is a rectangular substrate including short sides E1 and long sides E2, and is provided so that the short side E1 extends along the transport direction Fp.

The reception substrate 55 is provided with a connector 55*c*, and a reception-side cable 77 is connected to the connector 55*c*.

Figure 30:
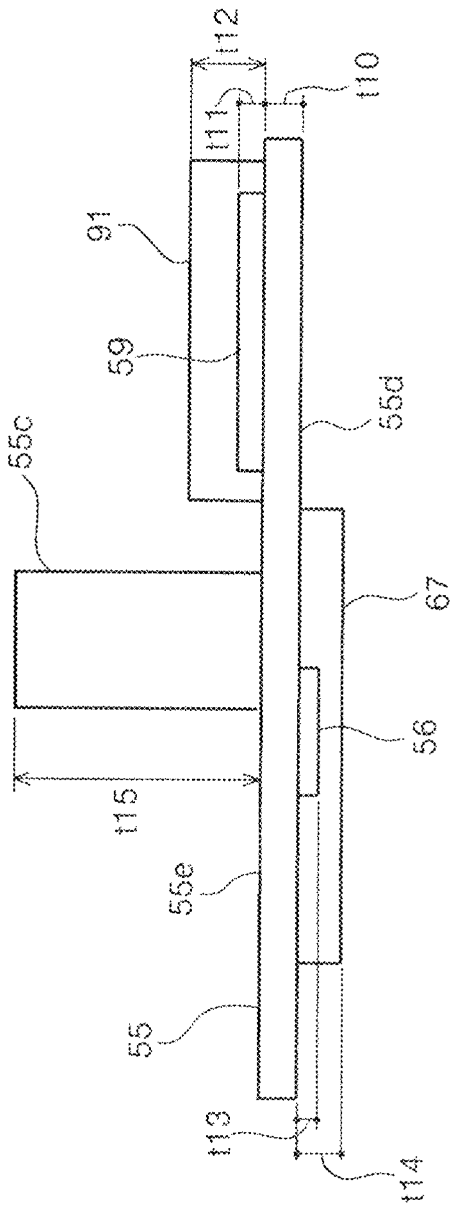
FIG. 30 is a side view of the reception substrate.

With reference to FIG. 30, the configuration of the reception substrate 55 is further described below. Note that, in FIG. 30 to FIG. 32, for the sake of illustration, the reception substrate 55 is illustrated horizontally.

The reception sensor chip 56 is fixed while being placed on a first substrate surface 55 of the reception substrate 55*d*. No other member, such as a pedestal, is interposed between the reception sensor chip 56 and the first substrate surface 55*d*, except for an adhesive.

Note that the first substrate surface 55*d* is a surface facing the transmission sensor chip 53, and the reference symbol 55*e* is a surface opposite to the first substrate surface 55*d*. The connector 55*c* is provided to the second substrate surface 55*e*.

The first substrate surface 55*d* is provided with a second surrounding member 67. In the embodiment, the second surrounding member 67 is formed of a metal plate material, and is fixed to the reception substrate 55 by an adhesive.

In the second surrounding member 67, an opening (omitted in illustration) similar to the opening 65*a* on the transmission side, which is illustrated in FIG. 15, is formed. The opening is formed so that the sensor center axis Lx of the ultrasonic detection unit 50 passes through the vicinity of the center of the opening. The second surrounding member 67 is provided to extend along the first substrate surface 55*d*.

Next, the second substrate surface 55*e* is provided with the reception circuit 59. The reception circuit 59 is in a form of a semiconductor chip, and an application specific integrated circuit (ASIC) is used, for example. The reception circuit 59 is fixed while being placed on the second substrate surface 55*e*. No other member, such as a pedestal, is interposed between the reception circuit 59 and the second substrate surface 55*e*, except for an adhesive.

The reception circuit 59 is covered with a shielding member 91. In the embodiment, similarly to the second surrounding member 67, the shielding member 91 is formed of a metal plate material so as to obtain an electromagnetic shield effect. The shielding member 91 is fixed to the second substrate surface 55*e* by an adhesive.

In FIG. 30, the reference symbol t10 is a thickness of the reception substrate 55, and is similar to the thickness t1 of the transmission substrate 52 (see FIG. 16). The reference symbol t11 is a height of the reception circuit 59 with respect to the second substrate surface 55*e*. The reference symbol t12 is a height of the shielding member 91 with respect to the second substrate surface 55*e*.

Further, the reference symbol t13 is a height of the reception sensor chip 56 with respect to the first substrate surface 55*d*. The reference symbol t14 is a height of the second surrounding member 67 with respect to the first substrate surface 55*d*.

As an example, the thickness t10 may be 0.8 to 1.2 mm, in particular, 1.0 mm.

Further, as an example, the height t11 may be 0.9 to 1.3 mm, in particular, 1.1 mm.

Further, as an example, the height t12 may be 1.8 to 2.2 mm, in particular, 2.0 mm.

Further, as an example, the height t13 may be 0.5 to 0.7 mm, in particular, 0.578 mm.

Further, as an example, the height t14 may be 1.2 to 1.6 mm, in particular, 1.4 mm.

In FIG. 22, the reception substrate fixing screw 57 includes a head portion including a driver fitting hole, a screw portion including a male screw, and a distal end portion of a distal end of the male screw. The screw portion is attached to an attached portion on the same side as the reception sensor chip 56, specifically, a screw hole 62*g* in the first substrate surface 55 of the reception substrate 55*d*. Note that the screw portion may be attached to an attached portion on a side opposite to the reception sensor chip 56, in other words, a screw hole in the first substrate surface 55 of the reception substrate 55*d*.

While the reception substrate 55 is fixed to the reception substrate holder 62, a position of a distal end portion 57*a* of the reception substrate fixing screw 57 is located in the +Da direction with respect to a most −Da-direction position 67*b* of the second surrounding member 67 in the normal direction Da.

Further, while the reception substrate 55 is fixed to the reception substrate holder 62, the position of the distal end portion 57*a* of the reception substrate fixing screw 57 is located in the −Lx direction with respect to the second surrounding member 67 in the axial direction of the sensor center axis Lx.

Further, a distance from the first substrate surface 55 of the reception substrate 55*d* to the second surrounding member 67 is less than a length of the screw portion of the reception substrate fixing screw 57.

As described above, the transmission substrate 52 is provided with the first surrounding member 65 that is a member surrounding the transmission sensor chip 53 and is a plate-like member provided to extend along the transmission substrate 52. Further, the reception substrate 55 is provided with the second surrounding member 67 that is a member surrounding the reception sensor chip 56 and is a plate-like member provided to extend along the reception substrate 55. With this, the transmission sensor chip 53 pr the reception sensor chip 56 can be protected from an external force. Further, in the embodiment, the first surrounding member 65 and the second surrounding member 67 are formed of a metal material. Thus, the transmission sensor chip 53 or the reception sensor chip 56 can be protected from an electromagnetic wave.

As described above, the reception substrate 55 includes the reception circuit 59 that amplifies a reception signal of an ultrasonic wave received by the reception sensor chip 56 and the shielding member 91 that is provided at the reception substrate 55 and covers at least a part of the reception circuit 59.

Further, the height t13 of the reception sensor chip 56 with respect to the reception substrate 55 is lower than the height t12 of the shielding member 91 with respect to the reception substrate 55. With this, in a configuration in which the reception sensor chip 56 and the shielding member 91 are provided to the reception substrate 55, a device dimension can be reduced.

Note that, in the embodiment, the shielding member 91 covers the entire reception circuit 59, but may cover a part of the reception circuit 59.

Further, in the embodiment, the height t13 of the reception sensor chip 56 with respect to the reception substrate 55 is lower than the height t11 of the reception circuit 59 with respect to the reception substrate 55.

Further, in the embodiment, the height t14 of the second surrounding member 67 with respect to the reception substrate 55 is lower than the height t12 of the shielding member 91 with respect to the reception substrate 55.

Further, in the embodiment, the height t12 of the embodiment of the shielding member 91 with respect to the reception substrate 55 is lower than the height t15 of the connector 55*c* with respect to the reception substrate 55.

Further, in the embodiment, in the reception substrate 55, the reception circuit 59 and the shielding member 91 are provided to the second substrate surface 55*e* opposite to the first substrate surface 55*d* provided with the reception sensor chip 56. With this, the one surface and the other surface of the reception substrate 55 can be utilized effectively, and the reception substrate 55 can easily be reduced in size. With this, a device dimension can be reduced.

Further, in the embodiment, the reception substrate 55 is provided with the connector 55*c* on the second substrate surface 55*e*. Further, the reception circuit 59 and the shielding member 91 are arranged on the second substrate surface 55*e*, which is provided with the connector 55*c*, of the reception substrate 55.

With this, the reception circuit 59 and the shielding member 91 are arranged in a space generated while arranging the connector 55*c*. Thus, a device dimension can be reduced.

Figure 31:
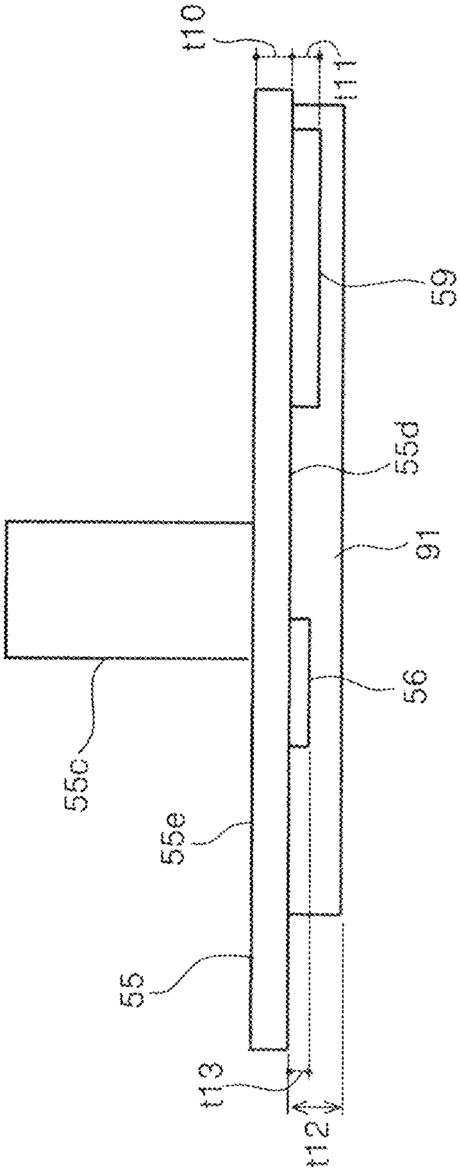
FIG. 31 is a side view of the reception substrate.

Note that, in another embodiment, as illustrated in FIG. 31, in the reception substrate 55, the reception circuit 59 may be arranged on the first substrate surface 55*d* provided with the reception sensor chip 56. In such a case, the shielding member 91 may cover the reception sensor chip 56 in addition to the reception circuit 59. In this manner, the same shielding member 91 covers the reception circuit 59 and the reception sensor chip 56. With this, a cost increase can be suppressed while reducing a device dimension.

Figure 32:
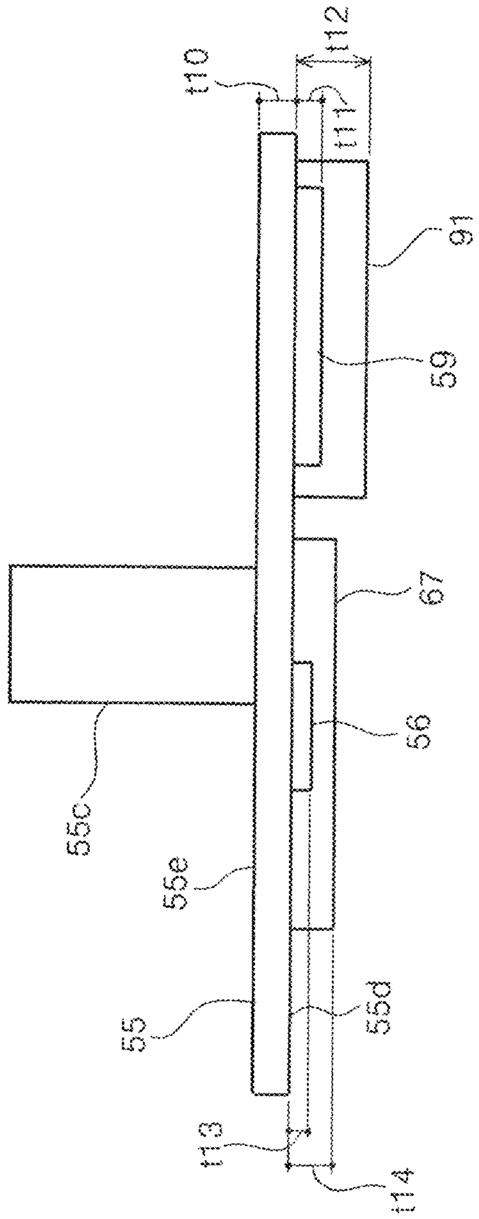
FIG. 32 is a side view of the reception substrate.

Note that, when the reception circuit 59 and the reception sensor chip 56 are provided to the first substrate surface 55*d*, the reception circuit 59 and the reception sensor chip 56 may be covered with different shielding members as illustrated in FIG. 32.

Further, in any one of the embodiments in FIG. 30, FIG. 31, and FIG. 32, the reception sensor chip 56 and the reception circuit 59 are provided to one reception substrate 55. Alternatively, an arrangement configuration equivalent to those in FIG. 30, FIG. 31, and FIG. 32 may be achieved by providing the reception sensor chip 56 and the reception circuit 59 to different substrates.

Configurations of First Protection Member and Second Protection Member

Next, the first protection member 70 and the second protection member 73 are described in detail.

Note that, in the embodiment, the first protection member 70 is formed of the same material as the second protection member 73, and the second holding member 74 that holds the second protection member 73 is formed of the same material as the first holding member 71 that holds the first protection member 70. Thus, the first protection member 70 and the first holding member 71 are described below, and the second protection member 73 and the second holding member 74 are omitted in description.

Figure 20:
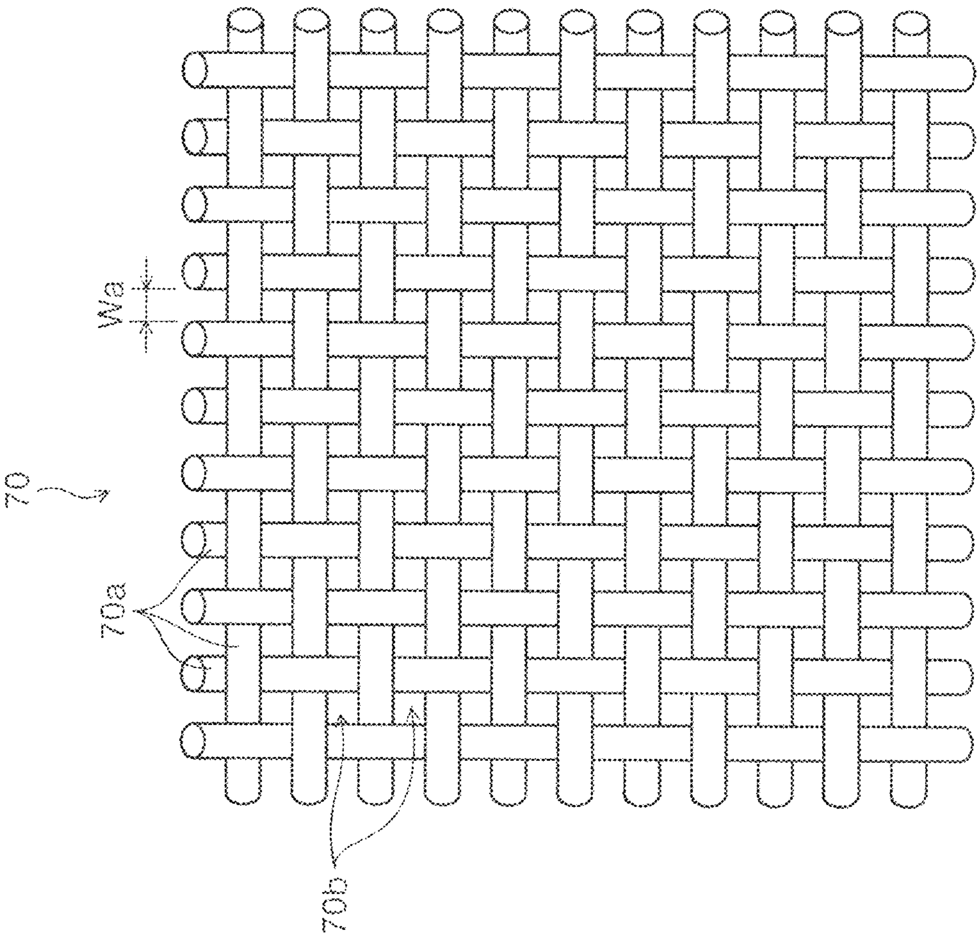
FIG. 20 is an enlarged plan view of the protection member.

In the embodiment, the first protection member 70 is a filter formed into a mesh-like shape. FIG. 20 illustrates a part of the first protection member 70 in an enlarged manner.

In FIG. 20, the first protection member 70 is a filter formed into a mesh-like shape by arranging wire rods 70*a* so as to cross each other. Note that FIG. 20 illustrates an example in which the wire rods 70*a* intersect at 90 degrees, which is not limited thereto. The wire rods 70*a* may intersect at an angle other than 90 degrees.

As the material of the wire rod 70*a*, a metal material such as copper, iron, brass, and SUS, an alloy material, a synthetic resin such as nylon and polyester, or the like may be used. As an example, in the embodiment, polyester is used.

Note that the rod diameter of the wire rod 70*a* may be less than a wavelength of an ultrasonic wave. With this, the disadvantage of an ultrasonic wave being diffusely reflected by the wire rod 70*a* of the first protection member 70 is suppressed.

In such a first protection member 70, an opening 70*b* is formed between a pair of adjacent wire rods 70*a*. The opening 70*b* corresponds to a hole portion through which an ultrasonic wave passes. In order to suppress adhesion or accumulation of a foreign matter, such as paper dust, onto the transmission surface 53*a* of the transmission sensor chip 53 and the reception surface 56*a* of the reception sensor chip 56, a width of the opening 70*b*, in other words, an opening width Wa may be 1 mm or less.

However, in the embodiment, when the device is cleaned by using a cleaning agent, the opening width Wa is set to 30 μm or less, and is set to 22 μm, for example so as to prevent the cleaning agent from passing through the opening 70*b*.

Note that, in FIGS. 12 to 14 and FIG. 19, the first protection member 70 or the second protection member 73 is illustrated in a mesh pattern so as to clearly indicate that the first protection member 70 and the second protection member 73 are mesh-like members. However, the intersection angle and the opening width Wa of the wire rods 70*a* are merely illustrative.

As described above, the first protection member 70 and the second protection member 73 are mesh-like members, and hence an ultrasonic wave can satisfactorily pass through the first protection member 70 and the second protection member 73.

The opening width Wa in the mesh-like member is 30 μm or less. Thus, when the device is cleaned by using a cleaning agent, the cleaning agent is prevented from passing through the first protection member 70 and adhering to the transmission sensor chip 53, or the cleaning agent is prevented from passing through the second protection member 73 and adhering to the reception sensor chip 56. As a result, reduction of intensity of an ultrasonic wave received by the reception sensor chip 56 and a malfunction causing erroneous detection can be suppressed.

The first protection member 70 described above is held by the first holding member 71 including an opening 71*b* for exposing the first protection member 70 as illustrated in FIG. 19. The first protection member 70 is sandwiched between the two first holding members 71, and thus is held by the first holding members 71. A double sided tape (omitted in illustration) is used between the first protection member 70 and the first holding member 71. With this, the first protection member 70 and the first holding member 71 are integrated.

Note that the relationship between the second protection member 73 and the second holding member 74 is similar to the relationship between the first protection member 70 and the first holding member 71 described above.

Next, the first protection member 70 is held by the transmission substrate holder 60 so as to be inclined at an angle $\alpha\mathbf{2}$ with respect to the document surface S as illustrated in FIG. 22. Similarly, the second protection member 73 is held by the reception substrate holder 62 so as to be inclined at the angle $\alpha\mathbf{2}$ with respect to the document surface S. With this, an angle formed between the first protection member 70 and the second protection member 73 is 0 degrees, in other words, the first protection member 70 and the second protection member 73 are parallel to each other.

In the embodiment, the angle $\alpha\mathbf{2}$ is set to an angle different from the angle $\alpha\mathbf{1}$, specifically, the angle $\alpha\mathbf{2}$ is set to be smaller than the angle $\alpha\mathbf{1}$.

In other words, when the angle $\alpha\mathbf{2}$ and the angle $\alpha\mathbf{1}$ are set to the same angle, in other words, the transmission surface 53*a* and the first protection member 70 are parallel to each other, multiple reflections between the transmission surface 53*a* and the first protection member 70 may be caused, and accurate double feeding detection may not be executed. The same applies when the reception surface 56*a* and the second protection member 73 are parallel to each other.

However, as described above, the angle $\alpha\mathbf{2}$ is set to an angle different from the angle $\alpha\mathbf{1}$. Thus, multiple reflections described above can be suppressed, and double feeding can be executed appropriately.

Note that, in the embodiment, as an example, the angle $\alpha\mathbf{1}$ is set to 20 degrees, and the angle $\alpha\mathbf{2}$ is set to 15 degrees.

Note that the distance between the transmission surface 53*a* and the first protection member 70 is also a factor causing multiple reflections of an ultrasonic wave. In other words, when the distance between the transmission surface 53*a* and the first protection member 70 is short, multiple reflections of an ultrasonic wave are caused. In the embodiment, in view of this, the distance between the transmission surface 53*a* and the first protection member 70, in other words, the distance along the sensor center axis Lx is set to 4.0 mm to 6.0 mm, and is set to 4.89 mm, for example.

The first protection member 70 described above is held by the transmission substrate holder 60 together with the transmission substrate 52. Thus, fluctuations in the distance between the transmission sensor chip 53 and the first protection member 70 can be suppressed. As a result, multiple reflections of an ultrasonic wave between the transmission sensor chip 53 and the first protection member 70 can be suppressed appropriately.

Similarly, the second protection member 73 is held by the reception substrate holder 62 together with the reception substrate 55. Thus, fluctuations in the distance between the reception sensor chip 56 and the second protection member 73 can be suppressed. As a result, multiple reflections of an ultrasonic wave between the reception sensor chip 56 and the second protection member 73 can be suppressed appropriately.

Further, the transmission substrate holder 60 includes the first opening 60*f* through which an ultrasonic wave passes, on the sensor center axis Lx, and the first protection member 70 is provided to cover the first opening 60*f* in the surface of the transmission substrate holder 60.

Similarly, the reception substrate holder 62 includes the second opening 62*f* through which an ultrasonic wave passes, on the sensor center axis Lx, and the second protection member 73 is provided to cover the second opening 62*f* in the surface of the reception substrate holder 62.

Accordingly, the following operational effects are obtained.

When a foreign matter remains adhering to the first protection member 70 or the second protection member 73, intensity of an ultrasonic wave received by the reception sensor chip 56 may be reduced, and erroneous detection may be caused. Therefore, in such a case, replacement of the first protection member 70 or the second protection member 73 and maintenance such as cleaning are required.

In the embodiment, the first protection member 70 is provided to cover the first opening 60*f* in the surface of the transmission substrate holder 60, and hence replacement and maintenance of the first protection member 70 are facilitated.

Further, similarly, the second protection member 73 is provided to cover the second opening 62*f* in the surface of the reception substrate holder 62, and hence replacement and maintenance of the second protection member 73 are facilitated.

Further, as described with reference to FIG. 22, the transmission sensor chip 53 and the reception sensor chip 56 are inclined at the angle $\alpha\mathbf{1}$ being a first angle with respect to the surface of the document P passing through between the transmission sensor chip 53 and the reception sensor chip 56.

Further, the first protection member 70 and the second protection member 73 are inclined at the angle $\alpha\mathbf{2}$ being a second angle with respect to the surface of the document P passing through between the transmission sensor chip 53 and the reception sensor chip 56.

Further, the angle $\alpha\mathbf{1}$ and the angle $\alpha\mathbf{2}$ are different from each other, and the angle $\alpha\mathbf{2}$ is less acute than the angle $\alpha\mathbf{1}$.

With this, the following actions and effects are obtained.

When the first protection member 70 and the second protection member 73 are parallel to the surface of the document P passing through between the transmission sensor chip 53 and the reception sensor chip 56, paper dust or the like easily adheres to the first protection member 70 and the second protection member 73. However, the first protection member 70 and the second protection member 73 are inclined at the angle $\alpha\mathbf{2}$ with respect to the surface of the document P passing through between the transmission sensor chip 53 and the reception sensor chip 56. Thus, adhesion of a foreign matter such as paper dust to the first protection member 70 and the second protection member 73 can be suppressed.

Note that the transmission sensor chip 53 and the reception sensor chip 56 are inclined at the angle $\alpha\mathbf{1}$ with respect to the surface of the document P passing through between the transmission sensor chip 53 and the reception sensor chip 56. Thus, multiple reflections of an ultrasonic wave between the transmission sensor chip 53 and the document P or between the reception sensor chip 56 and the document P can be suppressed.

Further, the angle $\alpha 1$ and the angle $\alpha 2$ are different from each other, and hence multiple reflections of an ultrasonic wave between the transmission sensor chip 53 and the first protection member 70 can be suppressed. Further, multiple reflections of an ultrasonic wave between the reception sensor chip 56 and the second protection member 73 can be suppressed.

Further, as described with reference to FIG. 5 to FIG. 7, the scanner 1 includes the transmission-side path formation member 36 being a member that forms the reading transport path R2 being a document transport path between the first roller pair 13 and the second roller pair 16 and fixes the transmission substrate holder 60. The transmission-side path formation member 36 is provided with the cover 37 that is removable and attachable. When the cover 37 is attached, the cover 37 covers the transmission substrate holder 60. When the cover 37 is removed, the separation roller 15 can be replaced, and the transmission substrate holder 60 is exposed. In particular, the first protection member 70 is exposed.

With this, the transmission substrate holder 60 can easily be accessed. As a result, for example, replacement and maintenance of the first protection member 70 are facilitated.

Further, the transmission substrate holder 60 includes the fixing portion 60*a* that fixes the first protection member 70. The transmission substrate 52 is fixed to the back side of the fixing portion 60*a*. The fixing portion 60*a* includes the first wall portion 60*b* that is a wall portion facing the side of the transmission substrate 52 being fixed and covers at least a part of the transmission substrate 52. With this, a foreign matter moves around from the side of the fixing portion 60*a* toward the transmission substrate 52, the first wall portion 60*b* can prevent such movement of the foreign matter.

Relationship Between Configuration of Ultrasonic Detection Unit and Other Configurations of Scanner Subsequently, relative positional relationships between the configuration of the ultrasonic detection unit 50 and other configurations of the scanner 1 are described.

Figure 23:
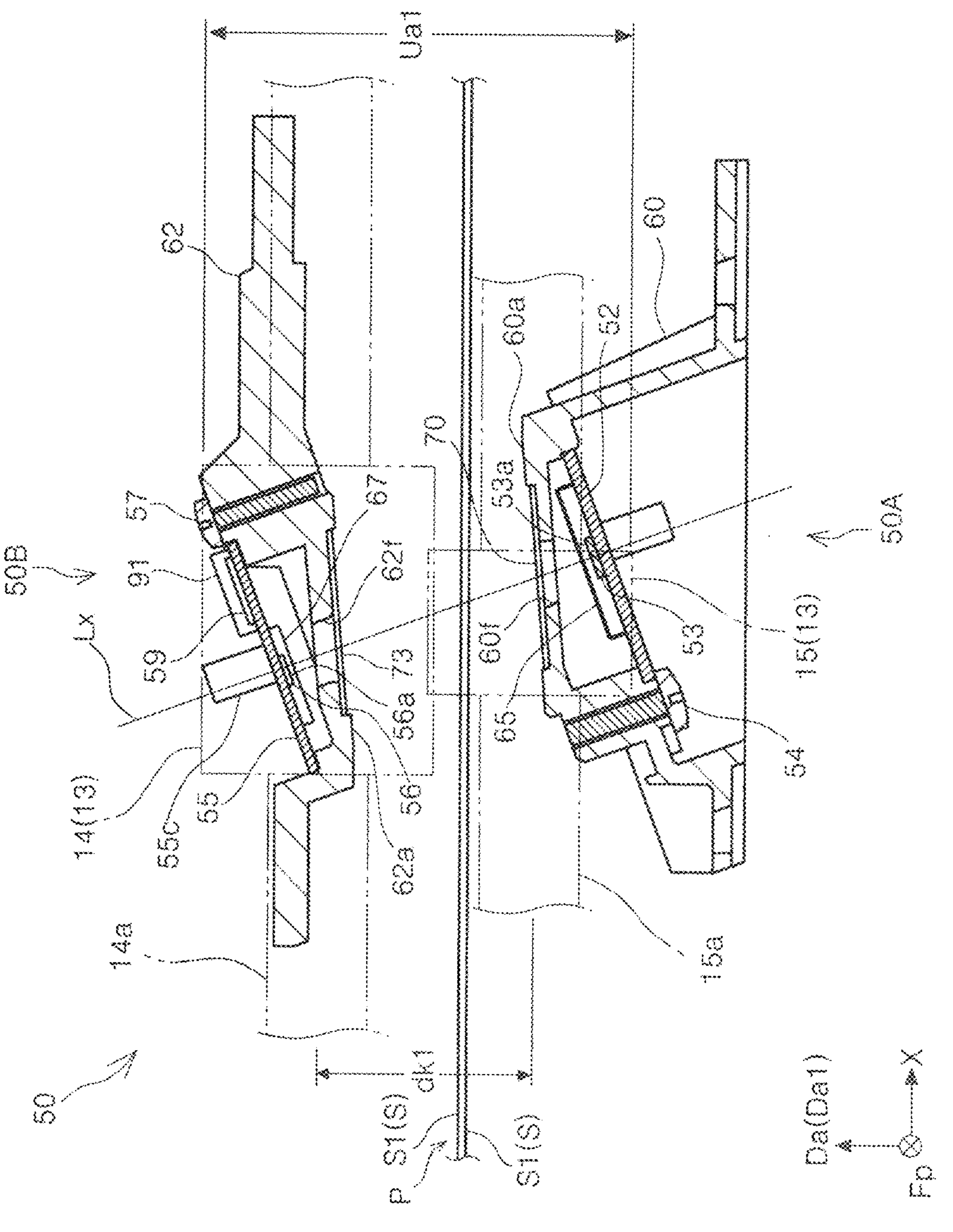
FIG. 23 is a view illustrating a positional relationship between the ultrasonic detection unit and a first roller pair.

First, with reference to FIG. 23, the positional relationship between the ultrasonic detection unit 50 and the first roller pair 13 is described. FIG. 23 illustrates the positional relationship between the ultrasonic detection unit 50 and the first roller pair 13 as viewed from upstream in the transport direction Fp. In FIG. 23, the feeding roller 14 and the separation roller 15 that form the first roller pair 13 are indicated by the two-dot chain line.

As illustrated, at least a part of the transmission sensor chip 53 and at least a part of the reception sensor chip 56 are on the inner side of a range Ua1 of the first roller pair 13 in the normal direction Da for the document surface S at the nipping position of the first roller pair 13. With this, the device dimension in the normal direction Da can be reduced.

Note that, in the embodiment, the entire transmission sensor chip 53 and the entire reception sensor chip 56 are on the inner side of the range Ua1 in the normal direction Da. However, a part of the transmission sensor chip 53 and a part of the reception sensor chip 56 may be on the inner side of the range Ua1 in the normal direction Da. Alternatively, a part of the transmission sensor chip 53 and the entire reception sensor chip 56 may be on the inner side of the range Ua1 in the normal direction Da. Alternatively, the entire transmission sensor chip 53 and a part of the reception sensor chip 56 may be on the inner side of the range Ua1 in the normal direction Da.

Further, in the embodiment, at least a part of the reception substrate 55 and at least a part of the shielding member 91 are on the inner side of the range Ua1 of the first roller pair 13 in the normal direction Da for the document surface S at the nipping position of the first roller pair 13. With this, the device dimension in the normal direction Da can be reduced.

Note that, in the embodiment, the entire reception substrate 55 and the entire shielding member 91 are on the inner side of the range Ua1 in the normal direction Da. However, a part of the reception substrate 55 or a part of the shielding member 91 may be on the inner side of the range Ua1 in the normal direction Da.

Note that the reference symbol 14*a* is a rotary shaft of the feeding roller 14, and the reference symbol 15*a* is a rotary shaft of the separation roller 15. In the embodiment, a distance between the shaft center of the rotary shaft 14*a* and the shaft center of the rotary shaft 15*a*, in other words, an inter-axial distance dk1 is 16.6 mm, which is shorter than the distance between the transmission sensor chip 53 and the reception sensor chip 56, in other words, the inter-sensor distance of 24.9 mm. With this, an occupied region of the first roller pair 13 in a direction along the inter-axial distance dk1 can be reduced, and a device dimension can be reduced.

Note that, in the embodiment, the shaft diameter of the rotary shaft 14*a* is 6.0 mm, and the shaft diameter of the rotary shaft 15*a* is 3.0 to 6.0 mm, for example, 3.9 mm or 5.18 mm. All of the shaft diameters thereof are greater than the thickness of the transmission sensor chip 53 or the reception sensor chip 56, which is 0.578 mm.

Figure 24:
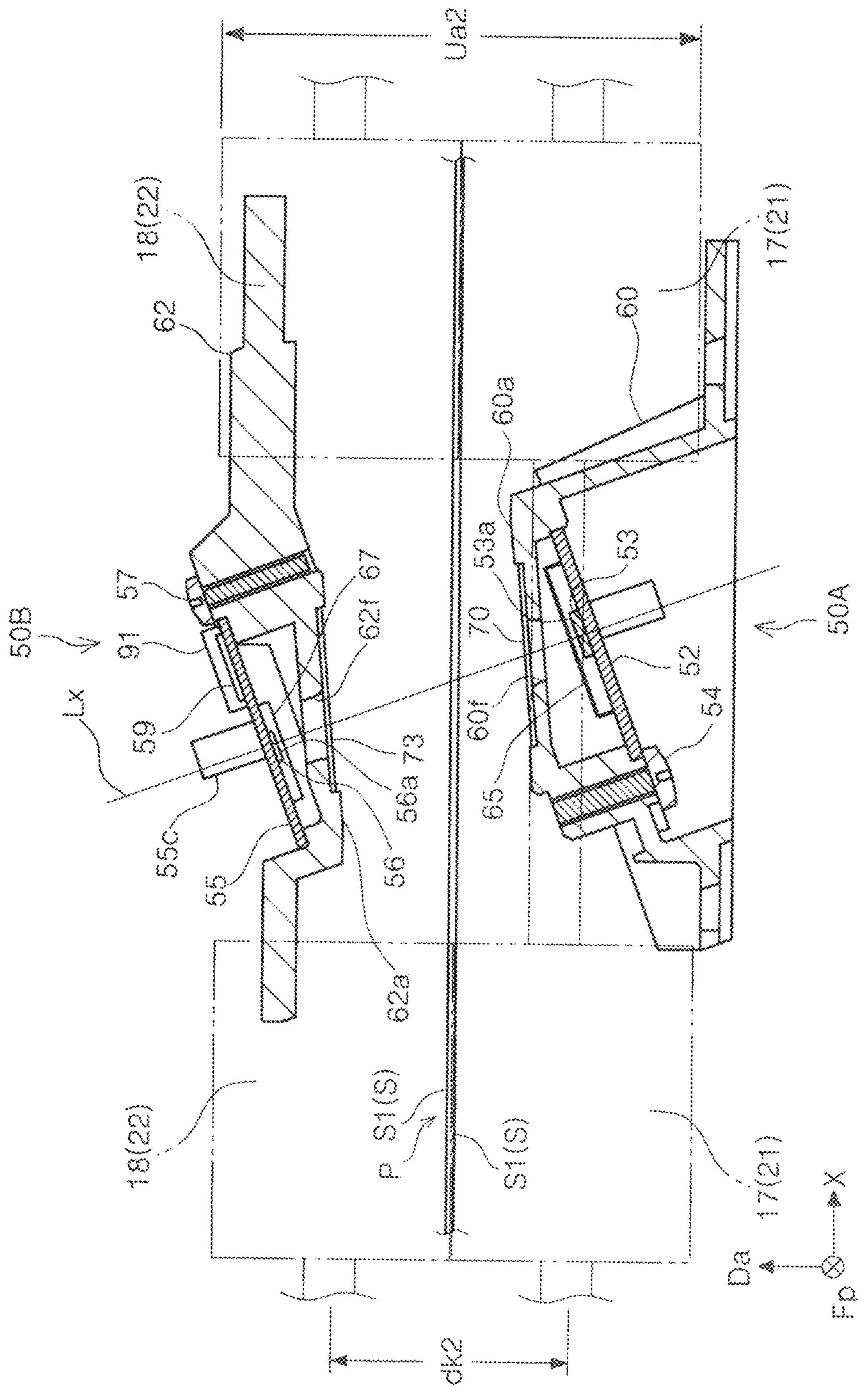
FIG. 24 is a view illustrating a positional relationship between the ultrasonic detection unit, and a second roller pair or a third roller pair.

Next, with reference to FIG. 24, the positional relationship between the ultrasonic detection unit 50, and the second roller pair 16 and the third roller pair 20 is described. FIG. 24 illustrates the positional relationship between the ultrasonic detection unit 50, and the second roller pair 16 and the third roller pair 20 as viewed from upstream in the transport direction Fp.

In FIG. 24, the second lower roller 17 and the second upper roller 18 that form the second roller pair 16 are indicated by the two-dot chain line. Note that the outline of the third lower roller 21 forming the third roller pair 20 overlaps with the second lower roller 17. Further, the outline of the third upper roller 22 forming the third roller pair 20 overlaps with the second upper roller 18.

Note that, while details thereof are described later, both the second upper roller 18 and the third upper roller 22 are provided to advance and retract with respect to the facing rollers. FIG. 24 illustrates a state in which both the second upper roller 18 and the third upper roller 22 contact with the facing rollers.

As illustrated, at least a part of the transmission sensor chip 53 and at least a part of the reception sensor chip 56 are on the inner side of a range Ua2 of the second roller pair 16 or the third roller pair 20 in the normal direction Da for the document surface S at the nipping position of the second roller pair 16 or the third roller pair 20. With this, a device dimension can be reduced in the normal direction Da for the document surface S at the nipping position of the second roller pair 16 or the third roller pair 20.

Note that, in the embodiment, the entire transmission sensor chip 53 and the entire reception sensor chip 56 are on the inner side of the range Ua2 in the normal direction Da. However, a part of the transmission sensor chip 53 and a part of the reception sensor chip 56 may be on the inner side of the range Ua2 in the normal direction Da. Alternatively, a part of the transmission sensor chip 53 and the entire reception sensor chip 56 may be on the inner side of the range Ua2 in the normal direction Da. Alternatively, the entire transmission sensor chip 53 and a part of the reception sensor chip 56 may be on the inner side of the range Ua2 in the normal direction Da.

Note that the relationships between the dimensions of the rotary shafts of the second lower roller 17, the second upper roller 18, the third lower roller 21, and the third upper roller 22 and the dimensions of the transmission sensor chip 53 and the reception sensor chip 56 are further described later.

Note that in the embodiment, a part of the transmission substrate 52 and the entire reception substrate 55 are on the inner side of the range Ua1 in the normal direction Da. However, the entire transmission substrate 52 and the entire reception substrate 55 may be on the inner side of the range Ua1 in the normal direction Da. Alternatively, a part of the transmission substrate 52 and a part of the reception substrate 55 may be on the inner side of the range Ua1 in the normal direction Da. Alternatively, the entire transmission substrate 52 and a part of the reception substrate 55 may be on the inner side of the range Ua1 in the normal direction Da.

Note that a distance between the rotary shaft center of the second lower roller 17 and the rotary shaft center of the second upper roller 18, or a distance between the rotary shaft center of the third lower roller 21 and the rotary shaft center of the third upper roller 22, in other words, an inter-axial distance dk2 is 15.4 mm, which is shorter than the distance between the transmission sensor chip 53 and the reception sensor chip 56, in other words, the inter-center distance of 24.9 mm.

With this, an occupied region of the second roller pair 16 or the third roller pair 20 in a direction along the inter-axial distance dk2 can be reduced, and a device dimension can be reduced.

Next, the transmission substrate 52 and the reception substrate 55 are inclined with respect to the normal direction Da for the document surface S passing through between the transmission sensor chip 53 and the reception sensor chip 56. The transmission surface 53*a* of the transmission sensor chip 53 extends along the surface of the transmission substrate 52. The reception surface 56*a* of the reception sensor chip 56 extends along the surface of the reception substrate 55.

Further, at least a part of the transmission substrate 52 and at least a part of the reception substrate 55 are within the range of the second roller pair 16 or the third roller pair 20 in the normal direction Da for the document surface S at the nipping position of the second roller pair 16 or the third roller pair 20. With this, the device dimension in the normal direction Da can be reduced.

Note that, in the embodiment, the entire transmission substrate 52 and a part of the reception substrate 55 are on the inner side of the range Ua2 in the normal direction Da. However, a part of the transmission substrate 52 and a part of the reception substrate 55 may be on the inner side of the range Ua2 in the normal direction Da. Alternatively, a part of the transmission substrate 52 and the entire reception substrate 55 may be on the inner side of the range Ua2 in the normal direction Da. Alternatively, the entire transmission substrate 52 and the entire reception substrate 55 may be on the inner side of the range Ua2 in the normal direction Da.

Further, in the embodiment, the entire transmission sensor chip 53 and the entire reception sensor chip 56 are on the inner side of the range Ua2 in the normal direction Da. However, a part of the transmission sensor chip 53 and a part of the reception sensor chip 56 may be on the inner side of the range Ua2 in the normal direction Da. Alternatively, a part of the transmission sensor chip 53 and the entire reception sensor chip 56 may be on the inner side of the range Ua2 in the normal direction Da. Alternatively, the entire transmission sensor chip 53 and a part of the reception sensor chip 56 may be on the inner side of the range Ua2 in the normal direction Da.

Further, in the embodiment, a part of the reception substrate 55 and a part of the shielding member 91 are on the inner side of the range Ua2 in the normal direction Da. With this, the device dimension in the normal direction Da can be reduced.

Note that, in the embodiment, a part of the reception substrate 55 and a part of the shielding member 91 are on the inner side of the range Ua1 in the normal direction Da. However, the entire reception substrate 55 or the entire shielding member 91 may be on the inner side of the range Ua1 in the normal direction Da.

Subsequently, with reference to FIG. 25, the configuration of the second roller pair 16 is further described.

In the embodiment, the two sets of the second roller pairs 16 are provided to extend along the X-axis direction, that is, the document width direction, and the two sets of the second roller pairs 16 are provided at symmetrical positions across a center position CL of the document P in the document width direction.

The reference symbol 17*a* is a rotary shaft of the second lower roller 17.

The reference symbol 18*a*1 is a rotary shaft located between the two second upper rollers 18, and the reference symbol 18*a*2 is a rotary shaft located between the two second upper rollers 18. The shaft diameter of the rotary shaft 18*a*1 is smaller than the shaft diameter of the rotary shaft 18*a*2.

The rotary shaft 18*a*2 located in the +X direction is connected to a first universal joint 31A. A second universal joint 31B is further provided in the +X direction with respect to the first universal joint 31A, and the first universal joint 31A and the second universal joint 31B are connected via the rotary shaft 18*a*3.

The second upper roller 18 advances and retracts with respect to the second lower roller 17, and a driving force is transmitted to the second upper roller 18. Thus, the second upper roller 18 can be driven by the first universal joint 31A and the second universal joint 31B while advancing and retracting with respect to the second lower roller 17.

Figure 25:
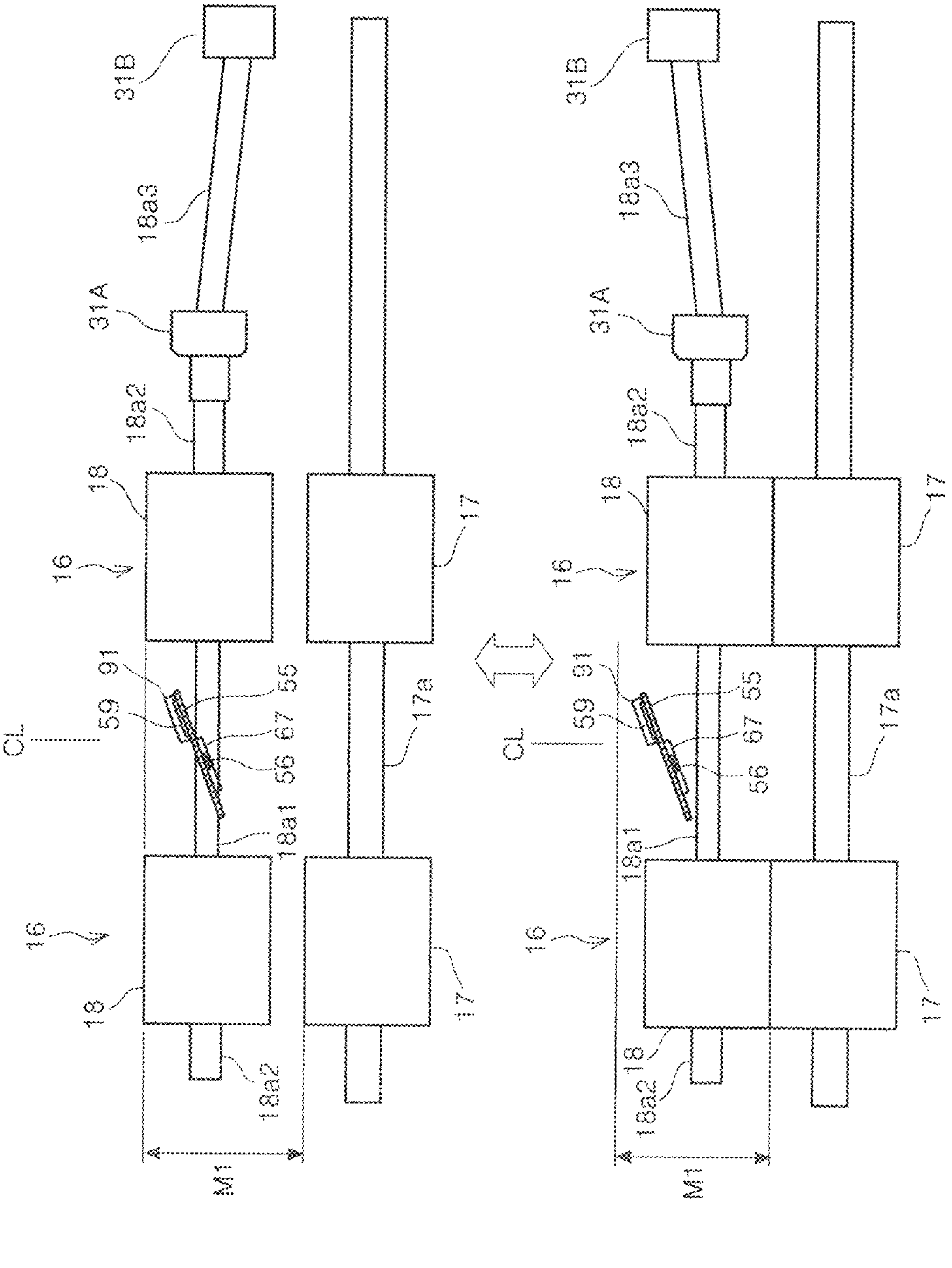
FIG. 25 is a view illustrating a configuration of the second roller pair.

The lower part of FIG. 25 illustrates a state in which the second upper roller 18 contacts with the second lower roller 17. The upper part of FIG. 25 illustrates a state in which the second upper roller 18 is farthest from the second lower roller 17. The reference symbol M1 is a range within which the second upper roller 18 moves.

As illustrated, in the embodiment, the entire reception sensor chip 56 and the entire reception substrate 55 are on the inner side of the range M1 in the normal direction Da. Thus, a device dimension in the normal direction Da can be reduced.

Note that, in the embodiment, the entire reception sensor chip 56 and the entire reception substrate 55 are on the inner side of the range M1 in the normal direction Da. However, a part of the reception sensor chip 56 and a part of the reception substrate 55 may be on the inner side of the range M1 in the normal direction Da. Alternatively, the entire reception sensor chip 56 and a part of the reception substrate 55 may be on the inner side of the range M1 in the normal direction Da.

Note that the relationship between the third roller pair 20, and the reception sensor chip 56 and the reception substrate 55 is similar to the above-mentioned relationship between the second roller pair 16, and the reception sensor chip 56 and the reception substrate 55.

Note that, in the embodiment, the shaft diameter of the rotary shaft 17*a* is 6.0 mm. Further, the shaft diameter of the rotary shaft 18*a*1 is 4.0 mm, the shaft diameter of the rotary shaft 18*a*2 is 5.0 mm, and the shaft diameter of the rotary shaft 18*a*3 is 4.5 mm. All of the shaft diameters thereof are greater than the thickness of the transmission sensor chip 53 or the reception sensor chip 56.

Note that, as described above, the path length between the first roller pair 13 and the second roller pair 16, in other words, the path length of the downstream feeding path R1 is shorter than the path length between the second roller pair 16 and the third roller pair 20, in other words, the path length of the reading transport path R2. With this, the path length between the first roller pair 13 and the second roller pair 16 can be reduced, and a device dimension can be reduced.

Further, in the embodiment, as described with reference to FIG. 13 to FIG. 15, the transmission substrate 52 and the reception substrate 55 include the long sides E2 and the short sides E1, and are provided so that the short sides E1 extend along the transport direction Fp. With this, the first roller pair 13 and the second roller pair 16 are close to each other in the transport direction Fp, which can contribute to device size reduction.

Further, the lengths of the short sides E1 of the transmission substrate 52 and the reception substrate 55 are shorter than a length of a glass plate 32*e* in the transport direction Fp.

Figure 26:
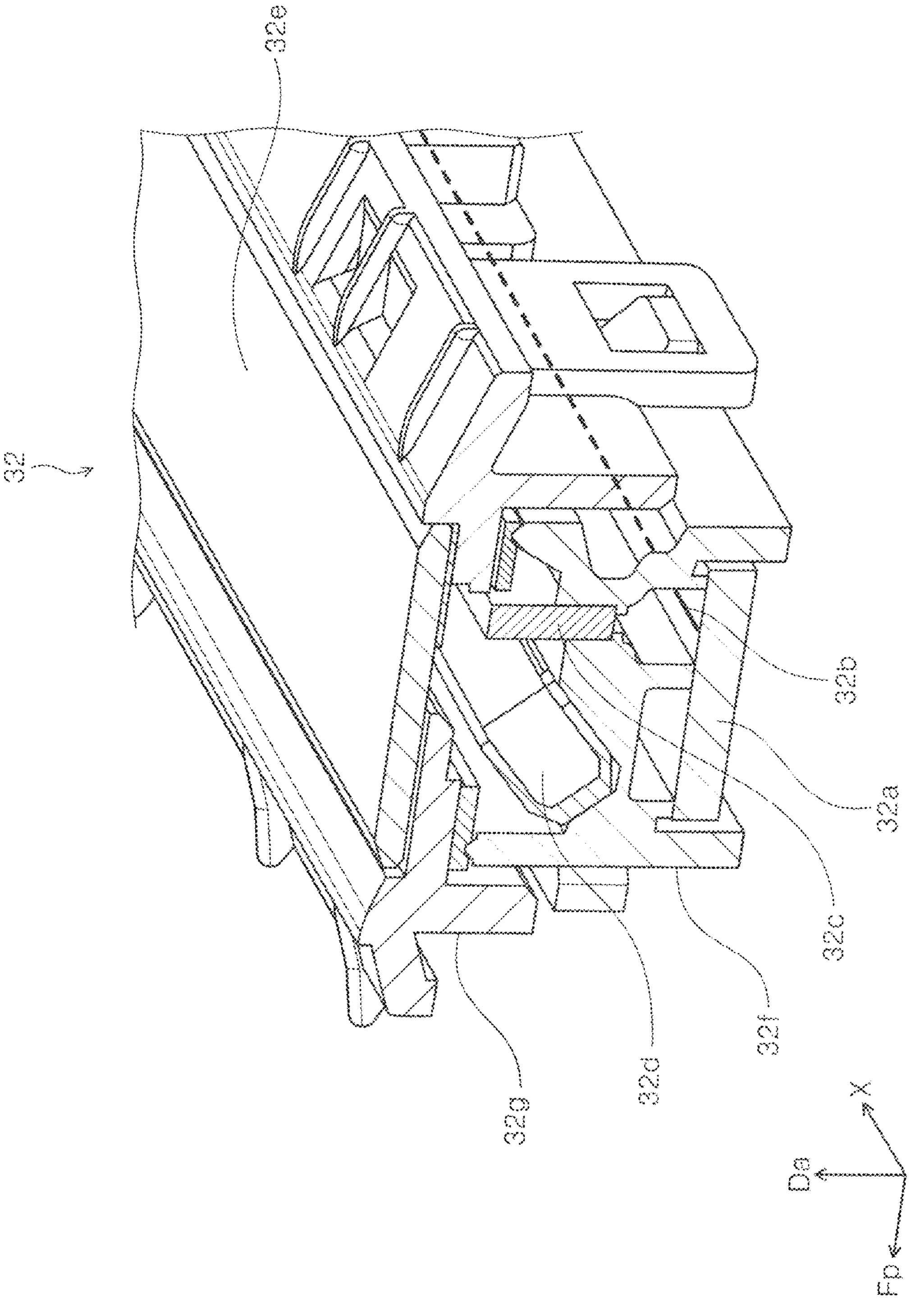
FIG. 26 is a cross-sectional perspective view illustrating a structure of a first reading unit.

Here, configurations of the first reading unit 32 and the second reading unit 33 are described with reference to FIG. 26. Note that the configurations of the first reading unit 32 and the second reading unit 33 are basically the same, and description is made below on the configuration of the first reading unit 32.

The first reading unit 32 includes a lower housing 32*f* and an upper housing 32*g*, and includes a sensor substrate 32*a* in the lower housing 32*f*. The sensor substrate 32*a* is provided with a line-like image sensor 32*b* being an example of a reading sensor, and the image sensor 32*b* receives reflection light from the document P via a lens 32*c*. Note that the reference symbol 32*d* is a light source that irradiates the document P.

The upper housing 32*g* is provided with the glass plate 32*e*. The glass plate 32*e* transmits light reflected by the document P toward the lens 32*c*. In addition, the glass plate 32*e* includes a function of contacting with the document P and guiding the document P downstream.

Further, as described above, the lengths of the short sides E1 of the transmission substrate 52 and the reception substrate 55 are shorter than the length of the glass plate 32*e* in the transport direction Fp. Note that, in the embodiment, the lengths of the short sides E1 of the transmission substrate 52 and the reception substrate 55 are 8.6 mm, the lengths of the long sides E2 thereof are 26.8 mm, and the length of the glass plate 32*e* in the transport direction Fp is 12.6 mm.

In this manner, the lengths of the short side E1 of the transmission substrate 52 and the reception substrate 55 in the transport direction Fp can be reduced. As a result, the first roller pair 13 and the second roller pair 16 are closer to each other in the transport direction Fp, which can further contribute to device size reduction.

Note that, in the embodiment, the thickness of the glass plate 32*e* is 1.1 mm, and is more than 0.578 mm, which is the thickness of the transmission sensor chip 53 or the reception sensor chip 56.

Figure 27:
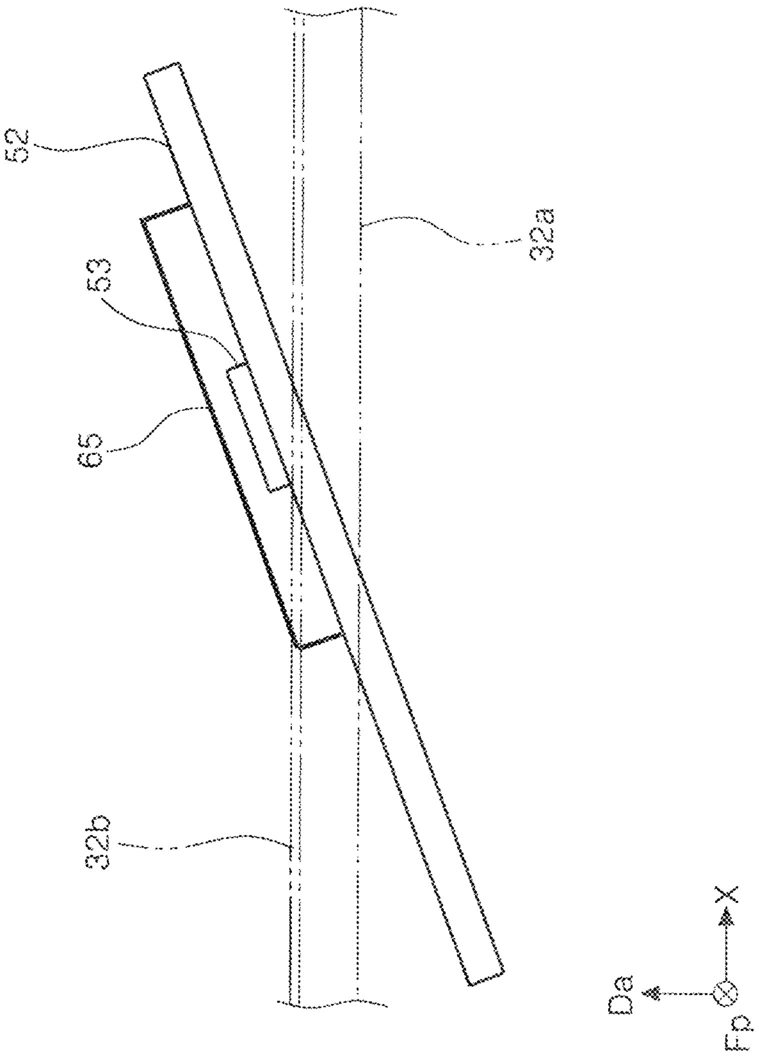
FIG. 27 is a view illustrating a positional relationship between a sensor substrate of the first reading unit, and the transmission sensor chip and the transmission substrate.

Next, FIG. 27 illustrates the positional relationship between the transmission substrate 52 and the transmission sensor chip 53, and the sensor substrate 32*a* and the image sensor 32*b* as the transmission substrate 52 and the transmission sensor chip 53 are viewed from upstream in the transport direction Fp. In FIG. 27, the sensor substrate 32*a* and the image sensor 32*b* are indicated by the two-dot chain line.

As illustrated, the transmission sensor chip 53 is located on the +Da side with respect to the image sensor 32*b*, in other words, the second reading unit 33 side in the normal direction Da. With this, an amount by which the transmission sensor chip 53 protrudes to the −Da side, in other words, downward from the first reading unit 32 in the normal direction Da can be reduced, and a device dimension in the normal direction Da can be reduced.

Figure 28:
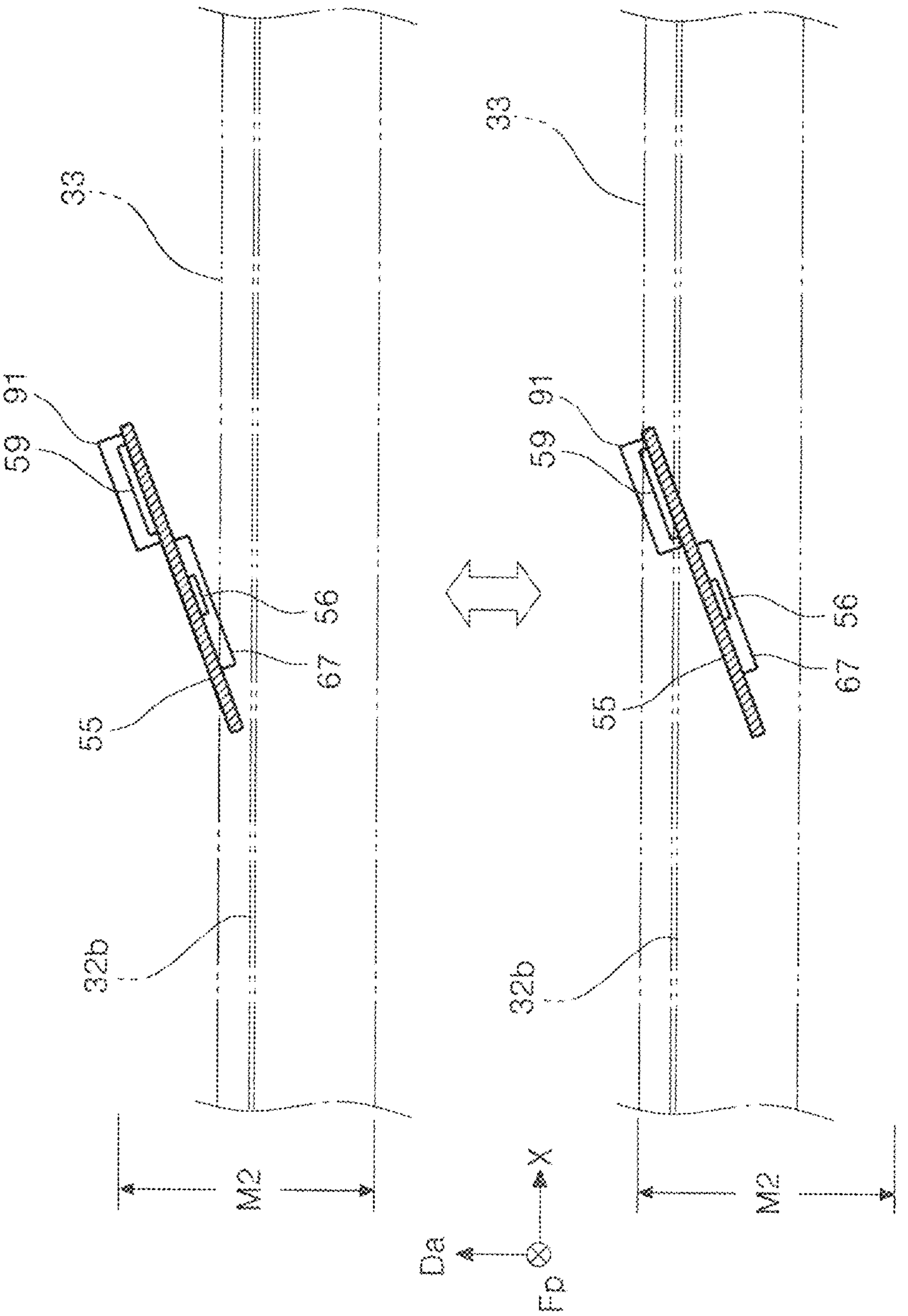
FIG. 28 is a view illustrating a second reading unit, and a reception sensor chip and a reception substrate.

Next, FIG. 28 illustrates the positional relationship between the transmission substrate 52 and the transmission sensor chip 53, and the second reading unit 33 as the transmission substrate 52 and the transmission sensor chip 53 are viewed from upstream in the transport direction Fp. In FIG. 28, the external shape of the second reading unit 33 and an image sensor 32B provided to the second reading unit 33 are indicated by the two-dot chain line.

The second reading unit 33 advances and retracts with respect to the first reading unit 32. The lower part of FIG. 28 illustrates the farthest state from the first reading unit 32, and the upper part of FIG. 28 illustrates the most advanced state with respect to the first reading unit 32. A range indicated with the reference symbol M2 is a region within which the second reading unit 33 is displaced.

As illustrated, at least a part of the reception sensor chip 56 is on the inner side of the range M2 in the normal direction Da. With this, the device dimension in the normal direction Da can be reduced.

Further, similarly, at least a part of the reception substrate 55 is on the inner side of the range M2 in the normal direction Da. With this, the device dimension in the normal direction Da can be reduced.

Note that, in the embodiment, the entire reception sensor chip 56 and the entire reception substrate 55 are on the inner side of the range M2 in the normal direction Da. However, a part of the reception sensor chip 56 and a part of the reception substrate 55 may be on the inner side of the range M2 in the normal direction Da. Alternatively, the entire reception sensor chip 56 and a part of the reception substrate 55 may be on the inner side of the range M2 in the normal direction Da.

Figure 29:
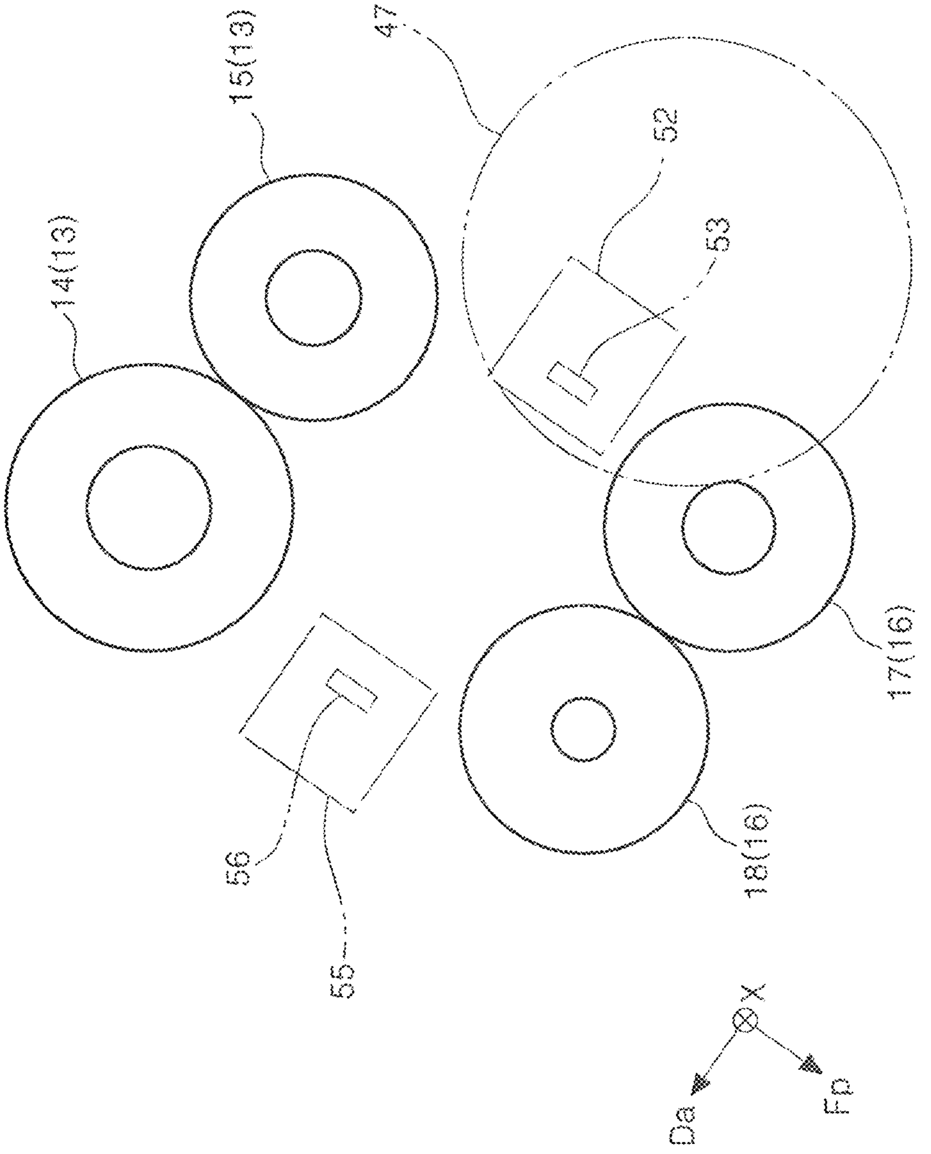
FIG. 29 is a view illustrating occupied regions of the first roller pair, the second roller pair, a transport motor, the transmission sensor chip, the transmission substrate, the reception sensor chip, and the reception substrate.

Next, FIG. 29 illustrates occupied regions of the first roller pair 13, the second roller pair 16, the transport motor 47, the transmission sensor chip 53, the transmission substrate 52, the reception sensor chip 56, and the reception substrate 55 as viewed in the X-axis direction.

As illustrated, at least a part of the transmission substrate 52 and at least a part of the transmission sensor chip 53 are within the occupied region of the transport motor 47. With this, an increase in the device size can be suppressed.

Note that, in the embodiment, a part of the transmission substrate 52 and the entire transmission sensor chip 53 are within the occupied region of the transport motor 47. The entire transmission substrate 52 and the entire transmission sensor chip 53 may be within the occupied region of the transport motor 47, or a part of the transmission substrate 52 and a part of the transmission sensor chip 53 may be within the occupied region of the transport motor 47.

The present disclosure is not intended to be limited to the aforementioned exemplary embodiments, and many variations are possible within the scope of the present disclosure as described in the appended claims. It goes without saying that such variations also fall within the scope of the present disclosure.

For example, in the embodiment described above, the medium transport device 100 is applied to the scanner 1 being an example of the image reading apparatus, which is not limited thereto. the medium transport device 100 may be applied to a recording device that performs recording with respect to a medium or a post processing device that executes post processing such as staple processing, punching processing, or the like with respect to a medium.

What is claimed is:

1. A medium transport device comprising:

a first roller pair configured to transport a medium in a transport direction;

a second roller pair arranged downstream of the first roller pair in the transport direction; and an ultrasonic detection unit arranged between the first roller pair and the second roller pair in the transport direction, wherein the ultrasonic detection unit includes:

a transmission sensor chip configured to emit an ultrasonic wave along a first axis toward a first surface of the medium being transported;

a reception sensor chip being configured to receive an ultrasonic wave and being arranged at a position on the first axis so that the medium is sandwiched between the reception sensor chip and the transmission sensor chip;

a transmission substrate being provided with the transmission sensor chip and including a substrate surface on which the transmission sensor chip is placed;

a reception substrate being provided with the reception sensor chip and including a first substrate surface on which the reception sensor chip is placed;

an amplifier being provided at the reception substrate and being configured to amplify a reception signal of an ultrasonic wave received by the reception sensor chip; and a shielding member being provided at the reception substrate and being configured to cover at least a part of the amplifier, wherein a height of the reception sensor chip with respect to the reception substrate is lower than a height of the shielding member with respect to the reception substrate, the first axis is inclined with respect to a surface of the medium passing through between the transmission sensor chip and the reception sensor chip, a thickness of the transmission sensor chip is less than a thickness of the transmission substrate, a thickness of the reception sensor chip is less than a thickness of the reception substrate, and at least a part of the transmission sensor chip and at least a part of the reception sensor chip are present within a range of the second roller pair in a normal line direction with respect to a surface of the medium at a nipping position of the second roller pair.

2. A medium transport device according to claim 1, wherein the amplifier and the shielding member are provided to a substrate surface of the reception substrate, the substrate surface being opposite to the first substrate surface on which the reception sensor chip is placed.

3. A medium transport device according to claim 1, wherein at least a part of the reception substrate and at least a part of the shielding member are present within any one of:

a range of the first roller pair in a normal line direction with respect to a surface of the medium at a nipping position of the first roller pair, and a range of the second roller pair in a normal line direction with respect to a surface of the medium at a nipping position of the second roller pair.

4. A medium transport device according to claim 1, wherein the reception sensor chip includes a piezoelectric element, the first axis is inclined with respect to a surface of the medium passing through between the transmission sensor chip and the reception sensor chip, and when the ultrasonic detection unit is calibrated, the reception sensor chip receives an ultrasonic wave while a bias voltage is applied to the reception sensor chip including the piezoelectric element, and the amplifier amplifies the reception signal.

5. A medium transport device according to claim 4, wherein the first axis is inclined with respect to a surface of the medium passing through between the transmission sensor chip and the reception sensor chip, and when the ultrasonic detection unit detects double feeding of media, the reception sensor chip receives an ultrasonic wave while a bias voltage is applied to the reception sensor chip, and the amplifier amplifies the reception signal.

6. An image reading apparatus comprising:

the medium transport device according to claim 1 and a reading unit being located downstream of the second roller pair in the transport direction and being configured to read an image of the medium.

7. A medium transport device comprising:

a first roller pair configured to transport a medium in a transport direction;

a second roller pair arranged downstream of the first roller pair in the transport direction; and an ultrasonic detection unit arranged between the first roller pair and the second roller pair in the transport direction, wherein the ultrasonic detection unit includes:

a transmission sensor chip configured to emit an ultrasonic wave along a first axis toward a first surface of the medium being transported;

a reception sensor chip being configured to receive an ultrasonic wave and being arranged at a position on the first axis so that the medium is sandwiched between the reception sensor chip and the transmission sensor chip;

a transmission substrate being provided with the transmission sensor chip and including a substrate surface on which the transmission sensor chip is placed;

a reception substrate being provided with the reception sensor chip and including a first substrate surface on which the reception sensor chip is placed;

an amplifier being provided at the reception substrate and being configured to amplify a reception signal of an ultrasonic wave received by the reception sensor chip; wherein a shielding member being provided at the reception substrate and being configured to cover at least a part of the amplifier, and a height of the reception sensor chip with respect to the reception substrate is lower than a height of the shielding member with respect to the reception substrate, the reception substrate is provided with a connector at a substrate surface opposite to the first substrate surface facing the transmission sensor chip, and the amplifier and the shielding member are arranged at a surface of the reception substrate, the surface being provided with the connector.

8. A medium transport device comprising:

a first roller pair configured to transport a medium in a transport direction;

a second roller pair arranged downstream of the first roller pair in the transport direction; and an ultrasonic detection unit arranged between the first roller pair and the second roller pair in the transport direction, wherein the ultrasonic detection unit includes:

a transmission sensor chip configured to emit an ultrasonic wave along a first axis toward a first surface of the medium being transported;

a reception sensor chip being configured to receive an ultrasonic wave and being arranged at a position on the first axis so that the medium is sandwiched between the reception sensor chip and the transmission sensor chip;

a transmission substrate being provided with the transmission sensor chip and including a substrate surface on which the transmission sensor chip is placed;

a reception substrate being provided with the reception sensor chip and including a first substrate surface on which the reception sensor chip is placed;

an amplifier being provided at the reception substrate and being configured to amplify a reception signal of an ultrasonic wave received by the reception sensor chip; and a shielding member being provided at the reception substrate and being configured to cover at least a part of the amplifier, wherein a height of the reception sensor chip with respect to the reception substrate is lower than a height of the shielding member with respect to the reception substrate, the amplifier is arranged at the first substrate surface of the reception substrate, the first substrate surface being a surface on which the reception sensor chip is placed, and the shielding member covers the reception sensor chip in addition to the amplifier.

* * * * *